United States Patent
Noda et al.

(10) Patent No.: US 9,201,218 B2
(45) Date of Patent: Dec. 1, 2015

(54) IMAGING LENS AND IMAGING APPARATUS EQUIPPED WITH THE IMAGING LENS

(71) Applicant: FUJIFILM Corporation, Tokyo (JP)

(72) Inventors: Takayuki Noda, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/548,317

(22) Filed: Nov. 20, 2014

(65) Prior Publication Data

US 2015/0077864 A1    Mar. 19, 2015

Related U.S. Application Data

(63) Continuation of application No. PCT/JP2013/003251, filed on May 22, 2013.

(60) Provisional application No. 61/660,001, filed on Jun. 15, 2012.

(30) Foreign Application Priority Data

May 23, 2012  (JP) ................................. 2012/117144
May 7, 2013   (JP) ................................. 2013/097737

(51) Int. Cl.
  *G02B 13/00*    (2006.01)
  *G02B 13/18*    (2006.01)
  *G02B 9/60*     (2006.01)

(52) U.S. Cl.
  CPC .............. *G02B 13/0045* (2013.01); *G02B 9/60* (2013.01); *G02B 13/18* (2013.01)

(58) Field of Classification Search
  CPC .................................................. G02B 13/0045
  USPC ........................................................... 359/714
  See application file for complete search history.

(56) References Cited

U.S. PATENT DOCUMENTS

| | | | |
|---|---|---|---|
| 7,274,515 B2 | 9/2007 | Noda | |
| 8,456,758 B1 * | 6/2013 | Huang et al. | 359/714 |
| 2011/0115965 A1 | 5/2011 | Engelhardt et al. | |
| 2011/0149415 A1 | 6/2011 | Jeong | |
| 2011/0181963 A1 | 7/2011 | Kwon | |
| 2012/0092778 A1 | 4/2012 | Tsai et al. | |
| 2012/0243108 A1 * | 9/2012 | Tsai et al. | 359/713 |
| 2013/0088788 A1 * | 4/2013 | You | 359/714 |

FOREIGN PATENT DOCUMENTS

KR    20090055115    6/2009

OTHER PUBLICATIONS

International Search Report PCT/JP2013/003251 dated Aug. 13, 2013.

* cited by examiner

*Primary Examiner* — Jordan Schwartz
(74) *Attorney, Agent, or Firm* — Young & Thompson

(57) ABSTRACT

An imaging lens is substantially constituted by five lenses, including: a first lens having a positive refractive power; a second lens having a negative refractive power; a third lens having a negative refractive power; a fourth lens having a negative refractive power; a fifth lens having a negative refractive power and an inflection point on the surface thereof toward the image side. All of the first lens through the fifth lens are single lenses, and the imaging lens satisfies predetermined conditional formulae.

20 Claims, 19 Drawing Sheets

IMAGING LENS AND IMAGING APPARATUS EQUIPPED WITH THE IMAGING LENS

CROSS REFERENCE TO RELATED APPLICATIONS

This application is a Continuation of PCT International Application No. PCT/JP2013/003251 filed on May 22, 2013, which claims priority under 35 U.S.C. §119(a) to Japanese Patent. Application No. 2012-117144 filed on May 23, 2012, U.S. Provisional Patent Application No. 61/660,001 filed on Jun. 15, 2012, and Japanese Patent Application No. 2013-097737 filed on May 7, 2013. Each of the above application(s) is hereby expressly incorporated by reference, in its entirety, into the present application.

BACKGROUND OF THE INVENTION

1. Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

2. Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the imaging entirety of the photography devices as well as imaging lenses to be mounted thereon. At the same time, the number of pixels in imaging elements is increasing, and there is demand for high resolution and high performance of imaging lenses. Performance corresponding to 5 megapixels or greater and more preferably 8 megapixels or greater, is desired.

In response to such demands, imaging lenses having a five lens configuration, which is a comparatively large number of lenses, have been proposed, in order to shorten the total length and to increase resolution, for example. For example, U.S. Patent Application Publication No. 20110181963, U.S. Pat. No. 7,274,515, Korean Patent Publication No. 10-2009-0055115, U.S. Patent Application Publication No. 20120092778, and U.S. Patent Application Publication No. 20110181963 propose imaging lenses with five lens configurations, constituted by: a first lens having a positive refractive power, a second lens having a negative refractive power, a third lens having a negative refractive power, a fourth lens having a negative refractive power, and a fifth lens, provided in this order from the object side (refer to U.S. Patent Application Publication No. 20110181963, U.S. Pat. No. 7,274, 515, Korean Patent Publication No. 10-2009-0055115, U.S. Patent Application Publication No. 20120092778, and U.S. Patent Application Publication No. 20110181963).

DISCLOSURE OF THE INVENTION

However, the imaging lens disclosed in U.S. Patent Application Publication No. 20110181963 cannot obtain a sufficient maximum image height with respect to the total length of the lens. Therefore, it is difficult for this imaging lens to be applied to an imaging element having a comparatively large image size that satisfies the demand for an increased number of pixels. In the case that the entirety of the imaging lens disclosed in U.S. Patent Application Publication No. 20110181963 is proportionately enlarged to meet a desired image size, the total length of the lens will become excessively long, and shortening of the total length of the lens cannot be realized.

Further, there is demand for imaging lenses for use in apparatuses such as cellular telephones, smart phones, and tablet terminals to be produced at low cost, to realize wide angles of view, and to have high performance, as well as having shortened total lengths. Among the imaging lenses disclosed in U.S. Pat. No. 7,274,515 and Korean Patent Publication No. 10-2009-0055115, those satisfying the power configuration of a first lens having a positive refractive power, a second lens having a negative refractive power, a third lens having a negative refractive power, a fourth lens having a negative refractive power, and a fifth lens, provided in this order from the object side, all employ cemented lenses. For this reason, the imaging lenses disclosed in U.S. Pat. No. 7,274,515 and Korean Patent Publication No. 10-2009-0055115 that satisfy the above power configuration incur cost for adhesive agents for adhesively attaching the cemented lenses together, and also involve adhesive attachment steps in addition to conventional production steps. Therefore, it is difficult for these imaging lenses to be produced at low cost. In addition, the imaging lenses disclosed in U.S. Patent Application Publication No. 20120092778 and U.S. Patent Application Publication No. 20110181963 have narrow angles of view with respect to requited specifications, and a further widening of the angles of view is desired.

The present invention has been developed in view of the foregoing points. The object of the present invention is to provide an imaging lens that can suppress production costs, can realize a wide angle of view and a shortening of the total length, which has a large image size and high imaging performance from a central angle of view to peripheral angles of view. It is another object of the present invention to provide an imaging apparatus equipped with the imaging lens, which is capable of obtaining high resolution photographed images.

A first imaging lens of the present invention substantially consists of five lenses, including:
a first lens having a positive refractive power;
a second lens having a negative refractive power;
a third lens having a negative refractive power;
a fourth lens having a negative refractive power;
a fifth lens having a negative refractive power and an inflection point on the surface thereof toward the image side, provided in this order from the object side;
all of the first lens through the fifth lens being single lenses; and
the imaging lens satisfying the following conditional formulae:

$$1.5 < Nd2 < 1.8 \quad (2)$$

$$vd4 < 35 \quad (5)$$

wherein Nd2 is the refractive index of the second lens with respect to the d and vd4 is the Abbe's number of the fourth lens with respect to the d line.

A second imaging lens of the present invention substantially consists of five lenses, including:
a first lens having a positive refractive power;
a second lens having a negative refractive power;

a third lens a negative refractive power;

a fourth lens having a negative refractive power;

a fifth lens having a negative refractive power and an inflection point on the surface thereof toward the image side, provided in this order from the object side;

all of the first lens through the fifth lens being single lenses; and the imaging lens satisfying the following conditional formulae:

$$1.5<Nd2<1.8 \quad (2)$$

$$-10<f234/f<-1.15 \quad (4)$$

wherein Nd2 is the refractive index of the second lens with respect to the d f234 is the combined focal length of the second lens, the third lens, and the fourth lens, and f is the focal length of the entire system.

Note that in the first and second imaging lenses of the present invention, the expression "substantially consists of five lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the five lenses.

The optical performance of the first and second imaging lenses of the present invention can be further improved by adopting the following favorable configurations.

In the first and second imaging lenses of the present invention, it is preferable for the fifth lens to have a concave surface toward the image side.

In the first and second imaging lenses of the present invention, it is preferable for an aperture stop to be positioned at the object side of the surface of the second lens toward the object side. It is further desirable for the aperture stop to be positioned at the object side of the surface of the first lens toward the object side.

In the first and second imaging lenses of the present invention, it is preferable for the first lens to be of a meniscus shape having a convex surface toward the object side.

In the first and second imaging lenses of the present invention, it is preferable for the second lens to have a concave surface toward the image side. In addition, it is preferable for the second lens to be of a meniscus shape.

In the first and second imaging lenses of the present invention it is preferable for the fourth lens to have a concave surface toward the image side. In addition, it is preferable for the fourth lens to be of a meniscus shape.

In the first and second imaging lenses of the present invention, it is preferable for the fifth lens to be of a meniscus shape having a concave surface toward the image side.

It is preferable for the first imaging lens of the present invention to satisfy any one of Conditional Formulae (1) through (4-2) below. Note that in a preferred aspect of the present invention, the first imaging lens may satisfy any one or arbitrary combinations of Conditional Formulae (1) through (4-2). In addition, it is preferable for the second imaging lens of the present invention to satisfy any one of Conditional Formulae (1) through (5) below. Note that in a preferred aspect of the present invention, the second imaging lens may satisfy any one or arbitrary combinations of Conditional Formulae (1) through (5).

$$1<f/f1<1.7 \quad (1)$$

$$1.05<f/f1<1.5 \quad (1-1)$$

$$1.1<f/f1<1.4 \quad (1-2)$$

$$-0.85<f/f2<0 \quad (3)$$

$$-9<f234/f<-1.15 \quad (4-1)$$

$$-8<f234/f<-1.16 \quad (4-2)$$

$$vd4<35 \quad (5)$$

wherein f is the focal distance of the entire system, f1 is the focal length of the first lens, f2 is the focal length of the second lens, f234 is the combined focal length of the second lens, the third lens, and the fourth lens and vd4 is the Abbe's number of the fourth lens with respect to the d line.

An imaging apparatus of the present invention is equipped with the first or second imaging lens of the present invention.

According to the first and second imaging, lenses of the present invention, the configuration of each lens element is optimized within a lens configuration having five lenses as a whole, and all of the lenses are single lenses. Therefore, adhesive attachment steps become unnecessary in the production steps of the imaging lenses, thereby suppressing production costs, and lens systems that can achieve a wide angle of view and a short total length, which has a large image size and high imaging performance from a central angle of view to peripheral angles of view, can be realized.

The imaging apparatus of the present invention outputs image signals corresponding to optical images formed by the first or second imaging lens of the present invention. Therefore, the imaging apparatus of the present invention is capable of obtaining high resolution photographed images.

BEST MODE FOR CARRYING OUT THE INVENTION

Hereinafter, embodiments of the present invention will be described in detail with reference to the attached drawings.

Figure 1:
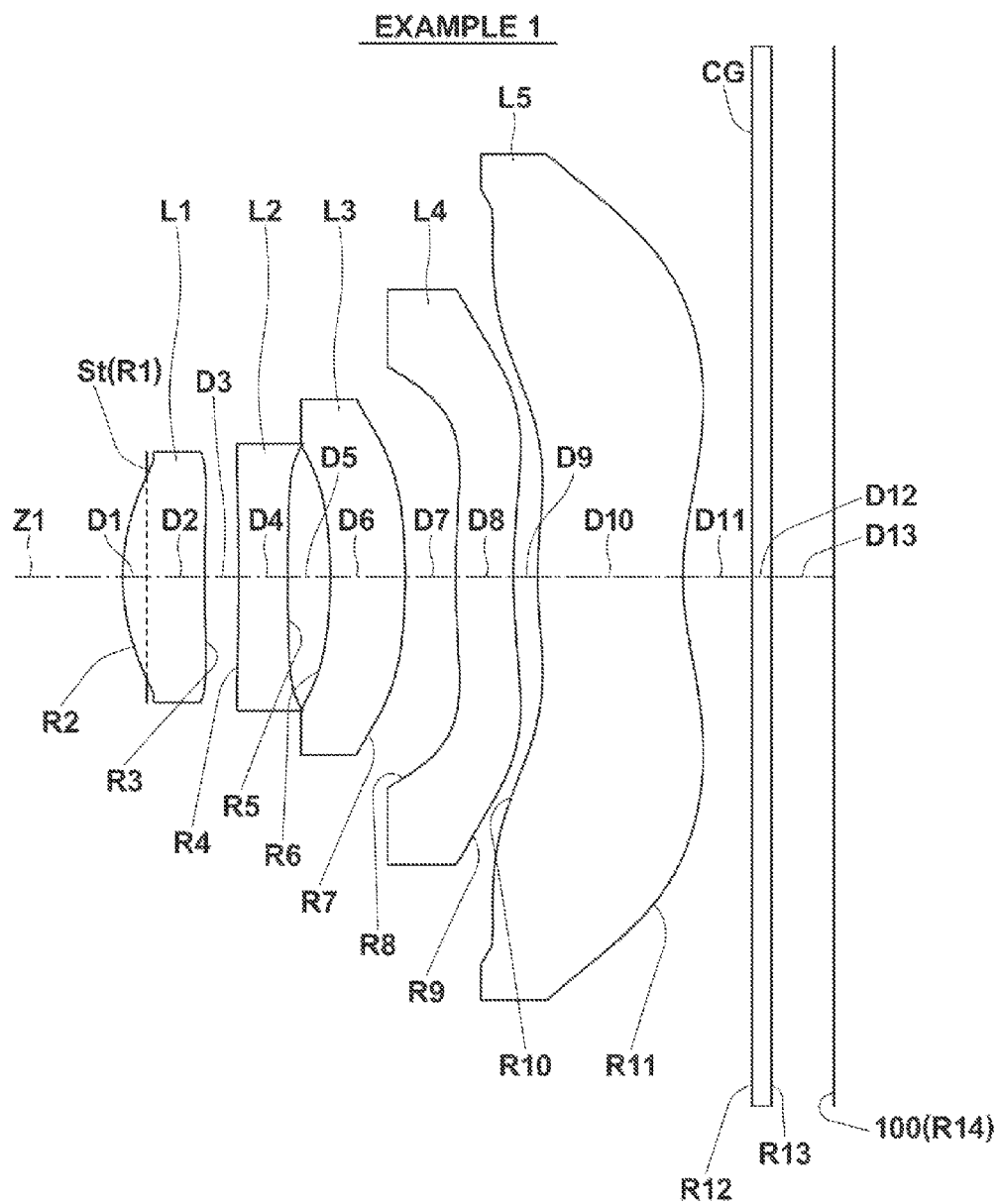
FIG. 1 is a sectional diagram that illustrates a first example of the configuration of an imaging lens according to an embodiment of the present invention, and corresponds to a lens of Example 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 9 are sectional diagrams that illustrate second through ninth examples of lens configurations that correspond to Numerical Examples 2 through 9 (Table 3 through Table 18) to be described later. In FIGS. 1 through 9, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 9 will also be described as necessary.

The imaging lens L of the embodiment of the present invention is favorably employed in various imaging devices that employ imaging elements such as a CCD and a CMOS. The imaging lens L of the embodiment of the present invention is particularly favorable for use in comparatively Miniature portable terminal devices, such as a digital still camera, a cellular telephone with a built in camera, as smart phone, a tablet type terminal, and a PDA. The imaging lens L is equipped with a first lens L1, a second lens L2, a third lens L3, a fourth lens L4, and a fifth lens L5. Along the optical axis Z1, in this order from the object side.

Figure 19:
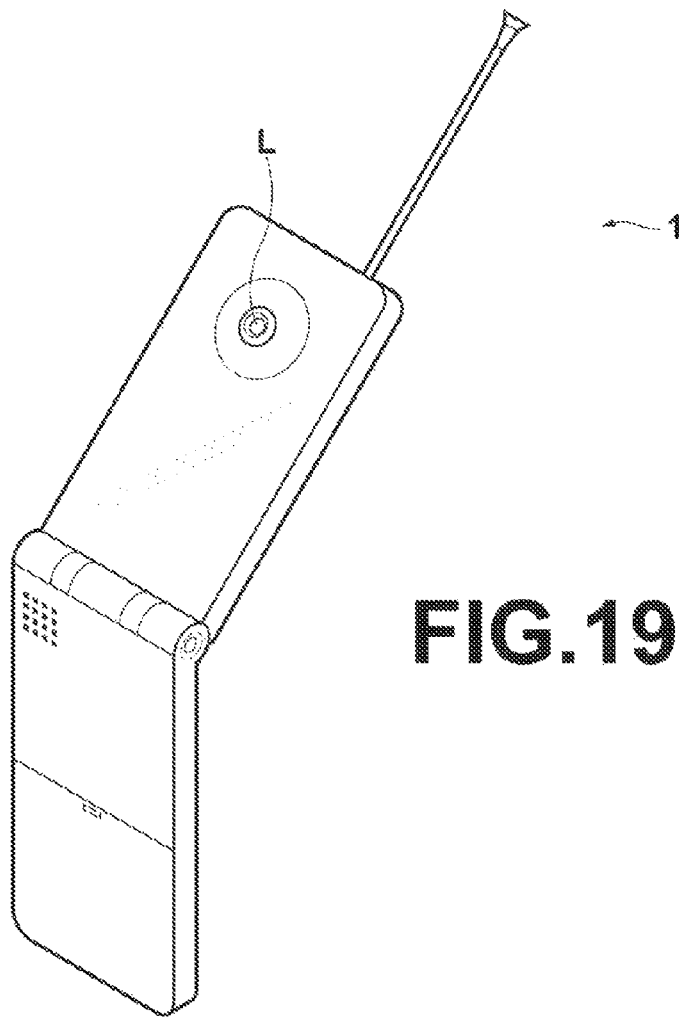
FIG. 19 is a diagram that illustrates a cellular telephone as an imaging apparatus equipped with the imaging lens of the present invention.

FIG. 19 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging plane) of the imaging lens L.

Figure 20:
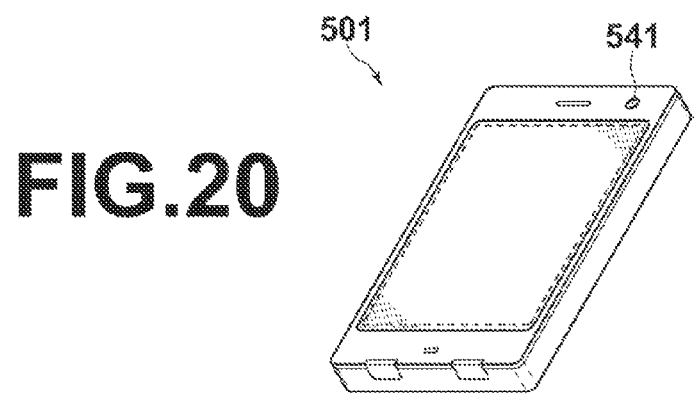
FIG. 20 is a diagram that illustrates a smart phone as an imaging apparatus equipped with the imaging lens of the present invention.

FIG. 20 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging plane) of the imaging lens L.

Various optical members CG may be provided between the fifth lens L5 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. In this case, the number of parts can be reduced, and the total length can be shortened.

The imaging lens L is equipped with an aperture stop St positioned at the object side of the surface of the second lens L2 toward the object side. By positioning the aperture stop at the object side of the surface of the second lens L2 toward the object side, increases in the incident angles of light rays at peripheral angles of view that enter the image formation plane (imaging element) can be suppressed. It is preferable for the apertures stop St to be positioned at the object side of the surface of the first lens L1 toward the object side, in order to cause this advantageous effect to become more prominent. Note that the expression "positioned at the object side of the surface of the second lens L2 toward the object side" means that the position of the aperture stop in the direction of the optical axis is at the same position as the intersection of marginal axial rays of light and the surface of the second lens L2 toward the object side, or more toward the object side than this position. Similarly, the expression "positioned at the object side of the surface of the first lens L1 toward the object side" means that the position of the aperture stop in the direction of the optical axis is at the same position as the intersection of marginal axial rays of light and the surface of the second lens L1 toward the object side, or more toward the object side than this position. Note that in the present embodiment, the lenses of Examples 1 through 5 and 7 through 9 (refer to FIG. 1 through FIG. 5 and FIG. 7 through FIG. 9) to be described later are examples in which the aperture stop St is positioned at the object side of the surface of the first lens L1 toward the object side. In addition, the imaging lens of Example 6 (refer to FIG. 6) is an example in which the aperture stop St is positioned at the object side of the surface of the second lens L2 toward the object side.

In the lenses of Examples 1 through 5 and 7 through 9 (refer to FIG. 1 through FIG. 5 and FIG. 7 through FIG. 9), the aperture stop St is positioned at the image side of the apex of the surface of the first lens L1. In the case that the aperture stop St is positioned at the image side of the apex of the surface of the first lens L1 in this manner, the total length of the imaging lens including the aperture stop St can be shortened. However, the present invention is not limited to such a configuration, and the aperture stop St may be positioned at the object side of the apex of the surface of the first lens L1. A case in which the aperture stop St is positioned at the object side of the apex of the surface of the first lens L1 is somewhat disadvantageous from the viewpoint of securing peripheral light compared to a case in which the aperture stop St is positioned at the image side of the apex of the surface of the first lens L1. However, increases in the incident angles of light ray at peripheral angles of view that enter the image formation plane (imaging element) can be more favorably suppressed.

In the imaging lens L, the first lens L1 has a positive refractive power in the vicinity of the optical axis. It is preferable for the first lens L1 to be of a meniscus shape having a convex surface toward the object side in the vicinity of the optical axis. In the case that the first lens L1 is of a meniscus shape having a convex surface toward the object side, the total length can be favorably shortened.

The second lens L2 has a negative refractive power in the vicinity of the optical axis. In addition, it is preferable for the second lens L2 to have a concave surface toward the image side in the vicinity of the optical axis. In the case that the second lens L2 has a concave surface toward the image side in the vicinity of the optical axis, the total length can be favorably shortened, and spherical aberration can be favorably corrected. In addition, it is preferable for the second lens L2 to be of a meniscus shape. In the case that the second lens L2 is of a meniscus shape having a concave surface toward the object side in the vicinity of the optical axis, the total length can be favorably shortened.

The third lens L3 has a negative refractive power in the vicinity of the optical axis.

The fourth lens L4 has a negative refractive power in the vicinity of the optical axis. Further, it is preferable for the fourth lens L4 to have a concave surface toward the image side in the vicinity of the optical axis. In the case that the fourth lens L4 has a concave surface toward the image side in the vicinity of the optical axis, the total length can be favorably shortened. It is preferable for the fourth lens L4 to be of a meniscus shape having a concave surface toward the image side in order to cause this advantageous effect to become more prominent.

It is preferable for the fifth lens L5 to have a negative refractive power in the vicinity of the optical axis. In the case that the fifth lens has a negative refractive power in the vicinity of the optical axis, the total length can be favorably shortened.

The surface toward the image side of the fifth lens L5 has an inflection point. By the surface toward the image, side of the fifth lens L5 having an inflection point in this manner, increases in the incident angles of light rays that pass through the optical system and enter the image formation plane (imaging element) can be suppressed, particularly at the peripheral portions of an imaging region. Thereby, a decrease in light receiving efficiency at the peripheral portions of an imaging region can be suppressed, while realizing a shortening of the total length. In each of the Examples described in the present specification, the inflection point is provided at the peripheral portion of the fifth lens L5. Therefore, this advantageous effect becomes more prominent. Note that the "inflection point" on the surface of the fifth lens L5 toward the image side refers to a point at which the shape of the surface of the fifth lens L5 toward the image side changes from a convex shape to a concave shape (or from a concave shape to a convex shape) with respect to the image side. The position of the inflection point may be any arbitrary position in an outwardly radial direction from the optical axis as long as it is within the effective diameter of the surface of the fifth lens L5 toward the image side.

In addition, it is preferable for the surface of the fifth lens L5 toward the image side to be of a concave shape in the vicinity of the optical axis. By the surface of the fifth lens L5 toward the image side being of a concave shape in the vicinity of the optical axis, the total length can be favorably shortened. Further, it is preferable for the fifth lens L5 to be of a meniscus shape having a concave surface toward the image side. By the fifth lens L5 being of a meniscus shape having a concave surface toward the image side, field curvature can be favorably corrected while the total length is favorably shortened.

As described above, the imaging lens L is configured such that the second lens L2 through the fourth lens L4 have negative refractive powers. For this reason, a large image size can be realized while shortening the total length. In addition, by concentrating the burden of positive refractive power of the imaging lens L in the first lens L1 the total length can be favorably shortened.

In addition, each of the lenses L1 through L5 that constitute the imaging lens L is a single lens, not a cemented lens. Thereby, adhesive attachment steps become unnecessary in the production steps, and cost for purchasing adhesive agents becomes unnecessary. Therefore, production costs can be suppressed to be lower than those for imaging lenses such as those disclosed in U.S. Pat. No. 7,274,515 and Korean Patent Publication No. 10-2009-0055115 which are equipped with cemented lenses. Further, it is considered that the imaging lenses disclosed in U.S. Pat. No. 7,274,515 and Korean Patent Publication No. 10-2009-0055115 that satisfy the aforementioned power configuration employ cemented lenses as the fast lens and the second lens, and therefore is disadvantageous from the viewpoint of connecting spherical aberration. In contrast, the first lens and the second lens of the imaging lens L are not cemented lenses, and therefore correction of spherical aberration is facilitated. In addition, by employing single lenses for all of the lenses, the number of aspherical surfaces will be greater than a case in which any of the lenses are cemented lenses. Therefore, the degree of freedom in the design of each lens will increase, and the total length can be favorably shortened.

In addition, it is preferable for at least one of the surfaces of each of the first lens L1 through the fifth lens L5 of the imaging L to be an aspherical surface, in order to improve performance.

Next, the operation and effects of conditional formulae related to the imaging lens L will be described in greater detail.

First, it is preferable for the focal length f6 of the sixth lens L6 and the focal length f of the entire system to satisfy Conditional Formula (1) below.

$$1<f/f1<1.7 \qquad (1)$$

Conditional Formula (1) defines a preferable range of numerical values for the ratio of the focal length f of the entire system with respect to the focal length f1 of the first lens L1. In the case that the value of f/f1 is less than the lower limit defined in Conditional Formula (1), the refractive index of the first lens L1 with respect to the refractive index of the entire system will become excessively weak, and shortening of the total length will become difficult. In addition, in the case that the value of f/f1 is greater than the upper limit defined in Conditional Formula (1), the refractive index of the first lens L1 with respect to the refractive index of the entire system will become excessively strong, and correction of spherical aberration will become difficult. Therefore, the total length can be favorably shortened and spherical aberration can be favorably corrected, by satisfying Conditional Formula (1). From the above viewpoint, it is more preferable for Conditional Formula (1-1) below to be satisfied, and even more preferable for Conditional Formula (1-2) to be satisfied.

$$1.05<f/f1<1.5 \qquad (1\text{-}1)$$

$$1.1<f/f1<1.4 \qquad (1\text{-}2)$$

In addition, the refractive index, Nd2 of the second lens L2 with respect to the d bile satisfies Conditional Formula (2) below.

$$1.5<Nd2<1.8 \qquad (2)$$

Conditional Formula (2) defines a preferable range of numerical values of the refractive index Nd2 of the second lens L2 with respect to the d line. In the case that the value of Nd2 is less than the lower limit defined in Conditional Formula (2), correction of longitudinal chromatic aberration will become difficult. In addition, in the case that the value of Nd2 is greater than the upper limit defined in Conditional Formula (2), spherical aberration will tend to be insufficiently corrected. If spherical aberration is to be corrected in a state in which the value of Nd2 is greater than the upper limit defined in Conditional Formula (2), it will become necessary to increase the refractive power of the first lens L1. As a result, fluctuations in the performance of the imaging lens L due to shifts in the arrangements of the first lens L1 and the second lens L2 will become great. The total length can be favorably shortened, and spherical aberration and longitudinal chromatic aberration can be favorably corrected. In addition, in the case that the second lens is formed by a material that satisfies Conditional Formula (2), the cost of the second lens can be reduced compared to a case in which a high refractive index material is employed for the second lens as in the imaging lenses disclosed in U.S. Pat. No. 7,274,515 and Korean Patent Publication No. 10-2009-0055115. From the above viewpoint, it is more preferable for Conditional Formula (2-1) below to be satisfied, and even more preferable for Conditional Formula (2-2) to be satisfied.

$$1.52<Nd2<1.73 \qquad (2\text{-}1)$$

$$1.55<Nd2<1.7 \qquad (2\text{-}2)$$

In addition, it is preferable for the focal length f2 of the second lens L2 and the focal length f of the entire system to satisfy Conditional Formula (3) below.

$$-0.85<f/f2<0 \qquad (3)$$

Conditional Formula (3) defines a preferable range of numerical values for the ratio of the focal length f of the entire system with respect to the focal length f2 of the second lens L2. In the case that the value of f/f2 is less than the lower limit defined in Conditional Formula (3), the negative refractive power of the second lens L2 with respect to the refractive power of the entire system will become excessively strong, which is disadvantageous from the viewpoint of shortening the total length. In addition, in the case that the value of f/f2 is greater than the upper limit defined in Conditional Formula (3), the negative refractive power of the second lens L2 with respect to the refractive power of the entire system will become excessively weak, and correction of longitudinal chromatic aberrations will become difficult. The total length can be favorably shortened and longitudinal chromatic aberration can be favorably corrected, by satisfying Conditional Formula (3). From the above viewpoint, it is more preferable for Conditional Formula (3-1) below to be satisfied, and even more preferable for Conditional Formula (3-2) to be satisfied.

$$-0.7<f/f2<0 \qquad (3\text{-}1)$$

$$-0.6<f/f2<-0.01 \qquad (3\text{-}2)$$

In addition, it is preferable for the combined focal length f234 of the second lens L2, the third lens L3, and the fourth lens L4 to satisfy Conditional Formula (4) below.

$$-10<f234/f<-1.15 \qquad (4)$$

Conditional Formula (4) defines a preferable range of numerical values for the combined focal length f234 of the second lens L2, the third lens L3, and the fourth lens L4. In the case that the value of f234/f is less than the lower limit defined in Conditional Formula (4), the combined refractive power of the second lens L2 through the fourth lens L4 with respect to the refractive power of the entire system will become excessively weak, and correction of longitudinal chromatic aberration and lateral chromatic aberration will become difficult. In addition, in the case that the value of f234 if is greater than the upper limit defined in Conditional Formula (4), the combined refractive power of the second lens L2 through the fourth lens L4 with respect to the refractive power of the entire system will become excessively strong, and it will become necessary to increase the positive refractive power of the first lens L1 resulting in correction of spherical aberration becoming difficult. The total length can be favorably shortened, and spherical aberration can be favorably corrected, by Conditional Formula (4) being satisfied. From the above viewpoint, it is more preferable for Conditional Formula (4-1) below to be satisfied, and even more preferable for Conditional Formula (4-2) to be satisfied.

$$-9<f234/f<-1.15 \qquad (4\text{-}1)$$

$$-8<f234/f<-1.16 \qquad (4\text{-}2)$$

In addition, the Abbe's number vd4 of the fourth lens L4 with respect to the d line satisfies Conditional Formula (5) below.

$$vd4<35 \qquad (5)$$

Conditional Formula (5) defines a preferable range of numerical values for the Abbe's number vd4 of the fourth lens L4 with respect to the d line. In the case that the value of vd4 is greater than the upper limit defined in Conditional Formula (5), it will become difficult to shorten the total length while sufficiently correcting lateral chromatic aberration at the peripheral portions of the imaging region. The total length can be favorably shortened and lateral chromatic aberration can be favorably corrected by satisfying Conditional Formula (5) and by forming the fourth lens L4 with a high dispersion material.

As described above, according to the imaging lens L of the embodiment of the present invention the configuration of each lens element is optimized within a lens configuration having five lenses as a whole, and all of the lenses are single lenses. Therefore, adhesive attachment steps become unnecessary in the production steps of the imaging lenses, thereby suppressing production costs, and a lens system that can achieve a wide angle of view and a short total length, which has a large image size and high imaging performance from a central angle of view to peripheral angles of view, can be realized. In addition, the imaging lens L of the embodiment of the present invention has a small F number of 3 or less, and may be favorably applied to a cellular telephone, a smart phone, a tablet terminal, etc.

Further improved imaging performance can be realized by satisfying preferred conditions appropriately. In addition, the imaging apparatuses according to the embodiments of the present invention output image signals corresponding to optical images formed by the high performance imaging lens L according to the embodiment of the present invention. Therefore, photographed images having high resolution from a central angle of view to peripheral angles of views can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, (the aperture stop St may be first, depending on the Example) are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface Si and an i+1st surface Si+1 from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column νdj. In addition, the values of the focal length f (mm) of the entire system and the back focus Bf (mm) are shown as item data in Table 1. Note that the back focus Bf is represented as an air converted value, and an air converted value is employed as the portion of the total length TL of the lens corresponding to the back focus Bf.

In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10$^{-2}$".

The values of coefficients Ai and K represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / \{1 + (1 - K \cdot C^2 \cdot h^2)^{1/2}\} + \Sigma A i \cdot h^i \quad (A)$$

wherein: Z is the depth of the aspherical surface (min), h is the distance from the optical axis to the Surface of the lens (height) (nm), C is the paraxial curvature=1/R (R is the paraxial radius of curvature), Ai is an ith ordinal aspherical surface coefficient (i is an integer 3 or greater), and K is an aspherical surface coefficient.

Figure 2:
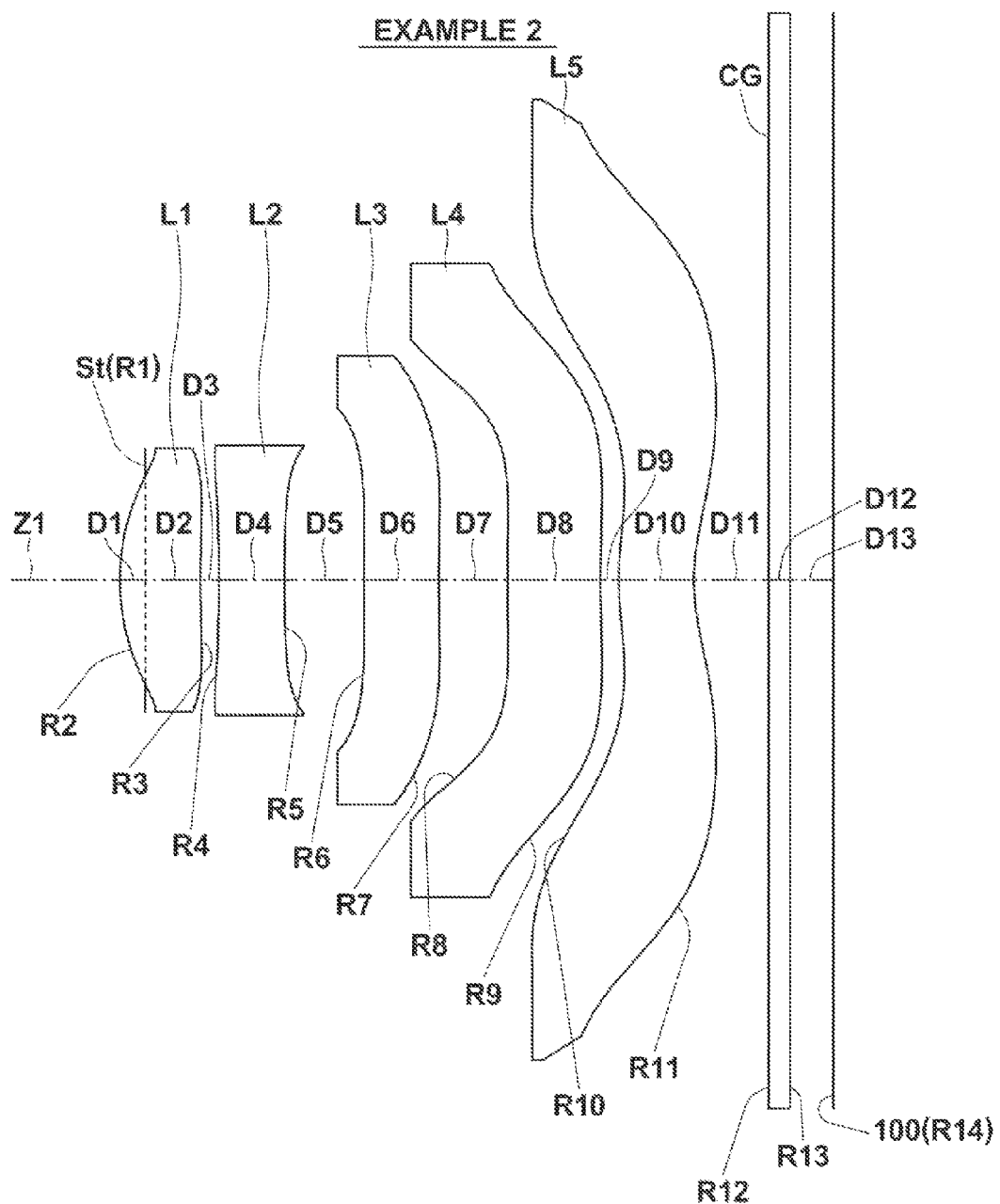
FIG. 2 is a sectional diagram that illustrates a second example of the configuration of an imaging lens according to an embodiment of the present invention, and corresponds to a lens of Example 2.
Figure 3:
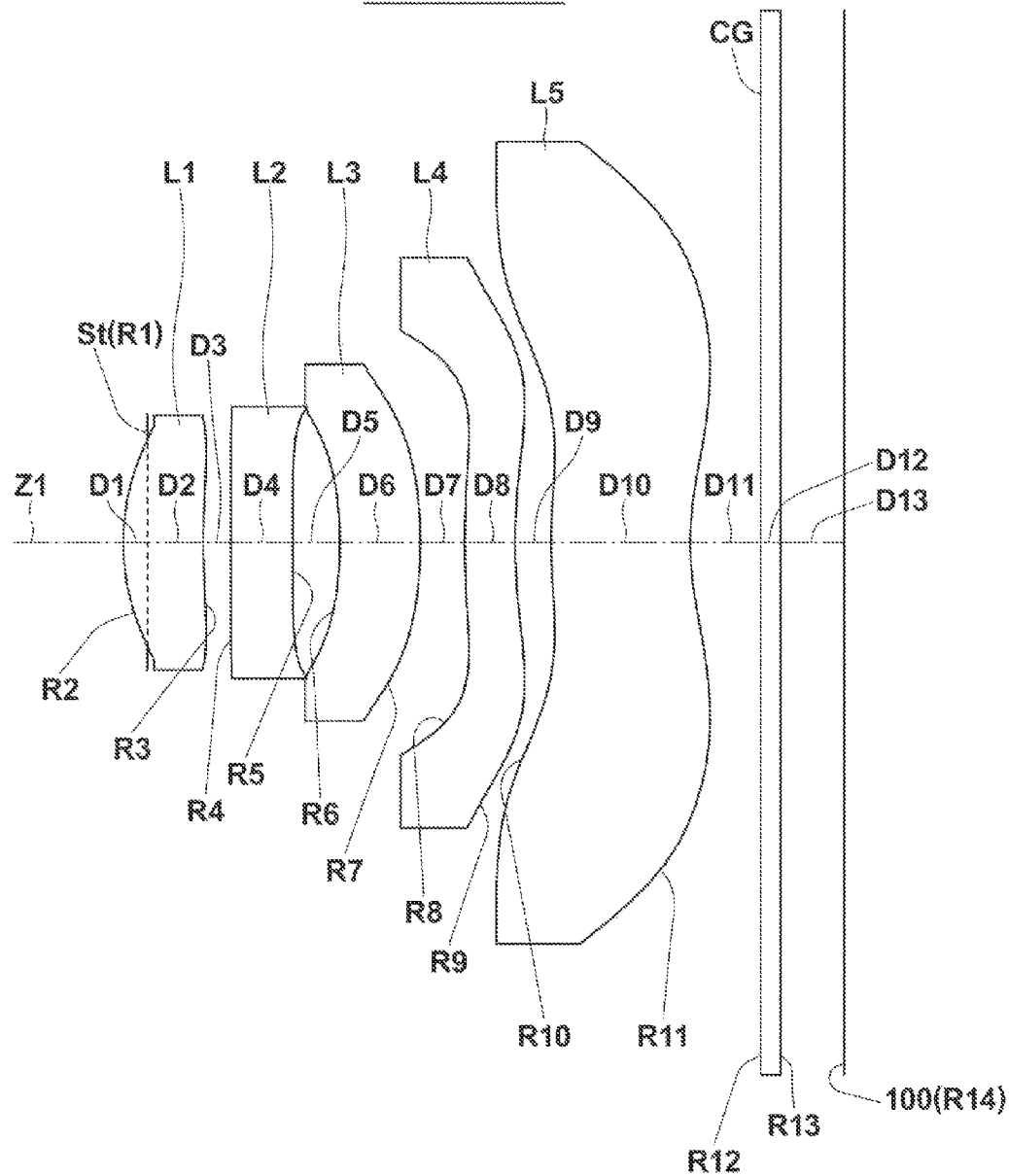
FIG. 3 is a sectional diagram that illustrates a third example of the configuration of an imaging lens according to an embodiment of the present invention, and corresponds to a lens of Example 3.
Figure 4:
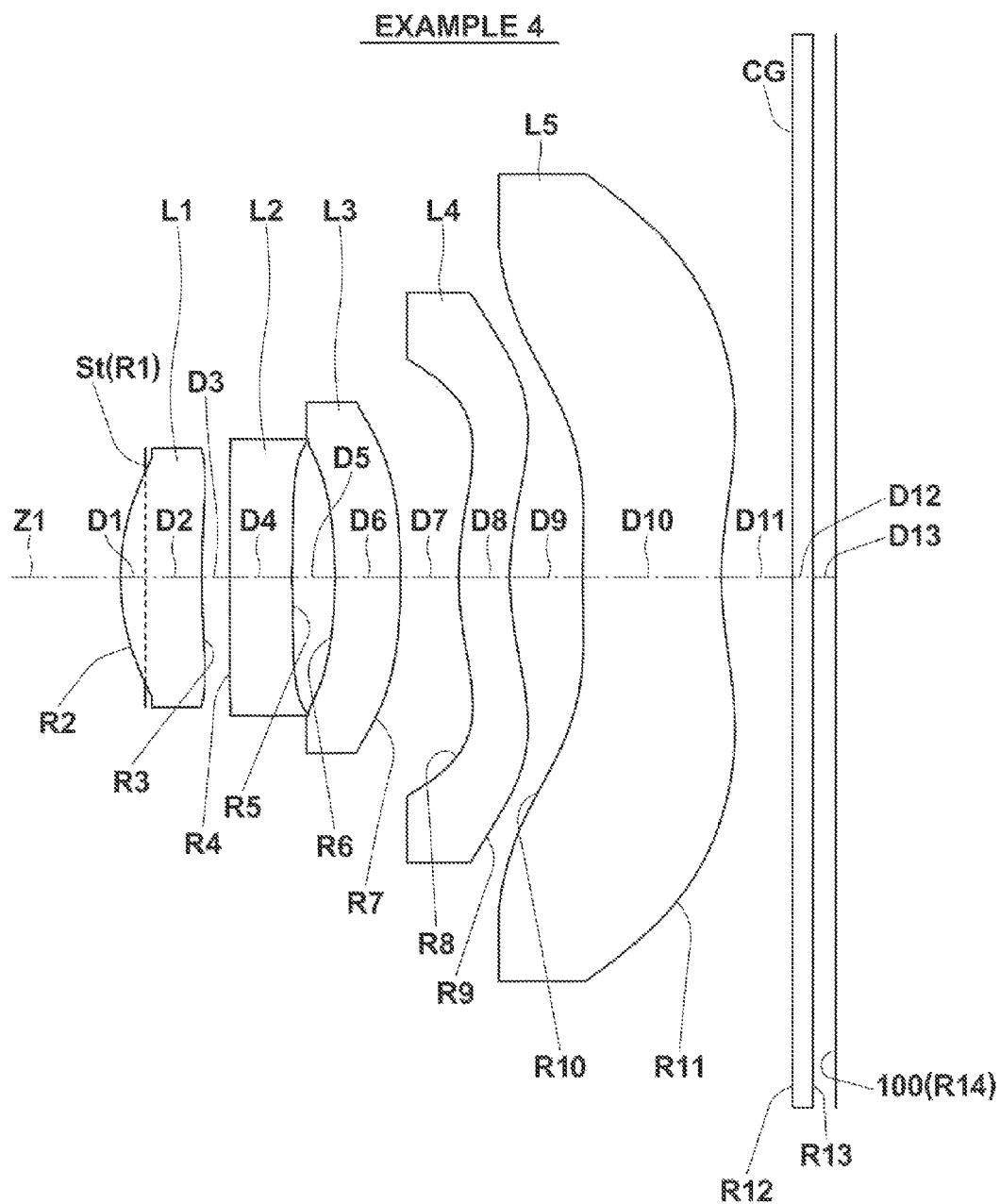
FIG. 4 is a sectional diagram that illustrates a fourth example of the configuration of an imaging lens according to an embodiment of the present invention, and corresponds to a lens of Example 4.
Figure 5:
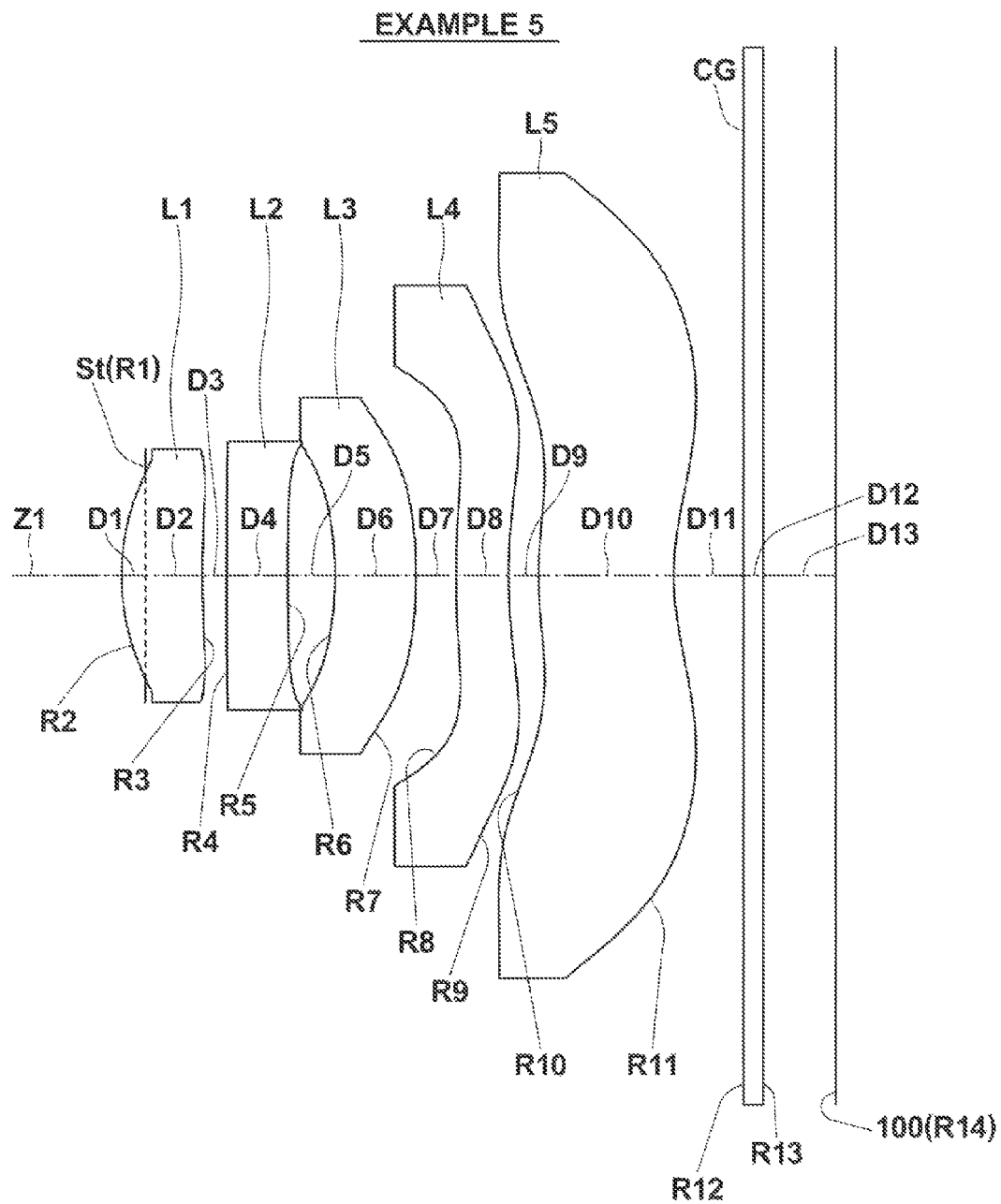
FIG. 5 is a sectional diagram that illustrates a fifth example of the configuration of an imaging lens according to an embodiment of the present invention, and corresponds to a lens of Example 5.
Figure 6:
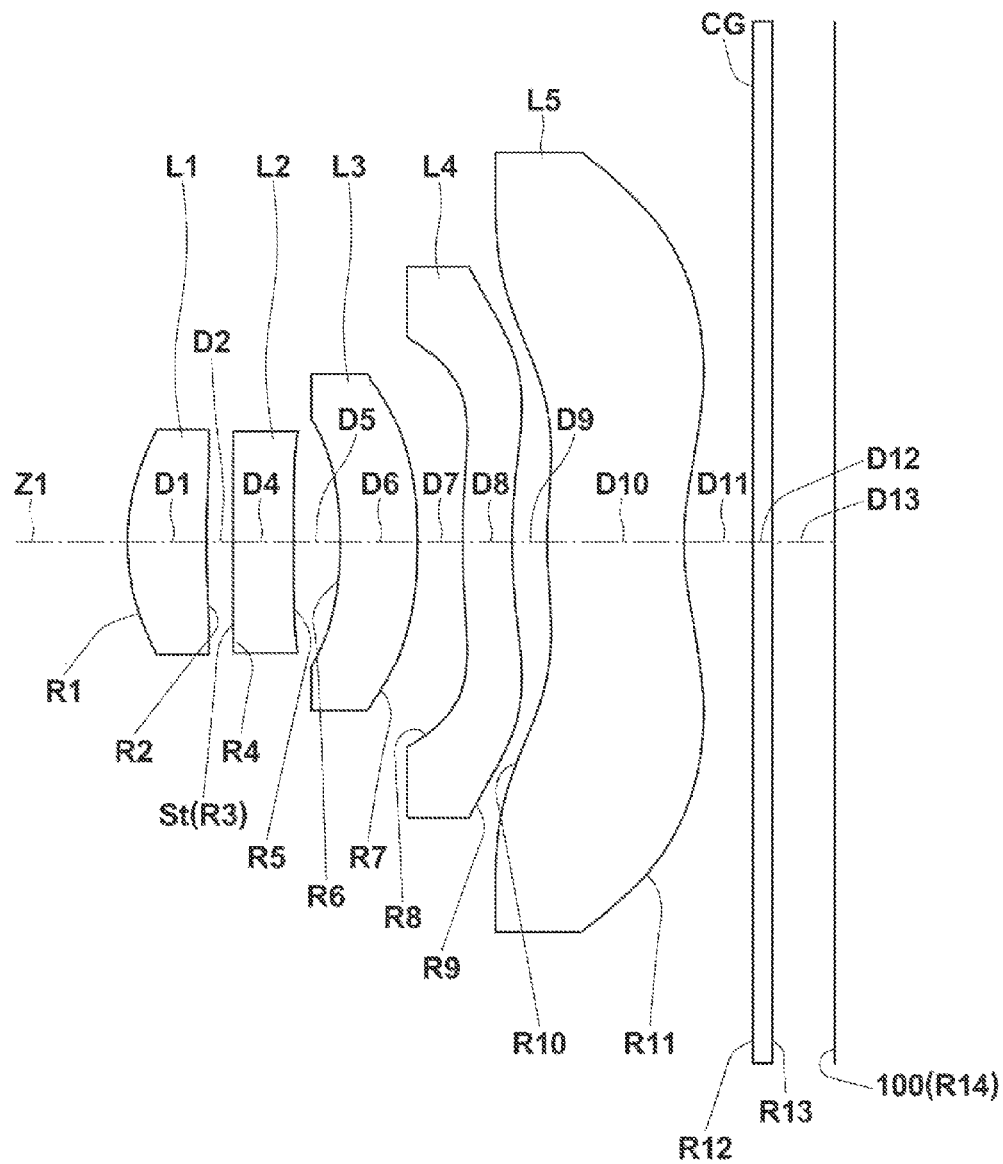
FIG. 6 is a sectional diagram that illustrates a sixth example of the configuration of an imaging lens according to an embodiment of the present invention, and corresponds to a lens of Example 6.
Figure 7:
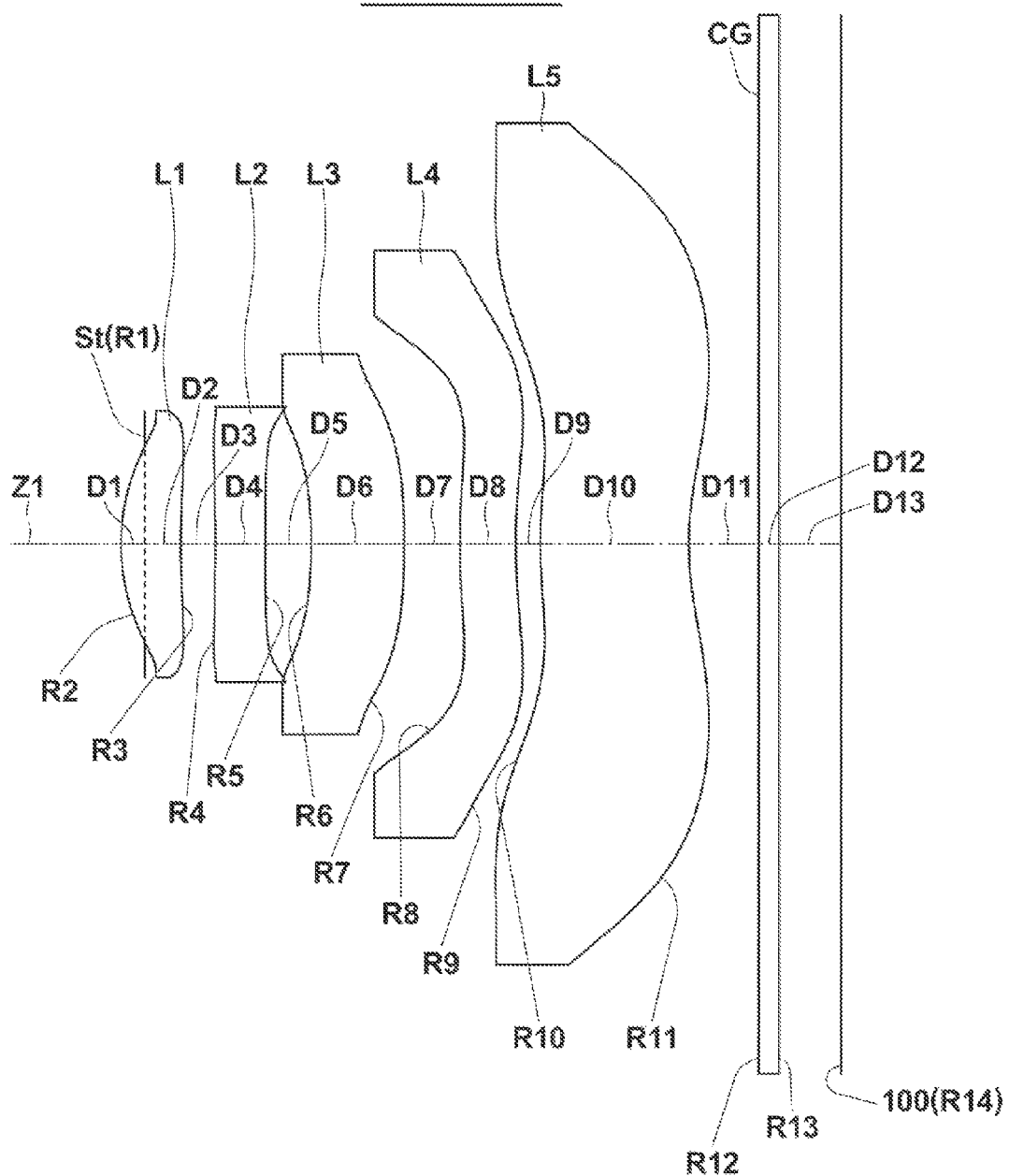
FIG. 7 is a sectional diagram that illustrates a seventh example of the configuration of an imaging lens according to an embodiment of the present invention, and corresponds to a lens of Example 7.
Figure 8:
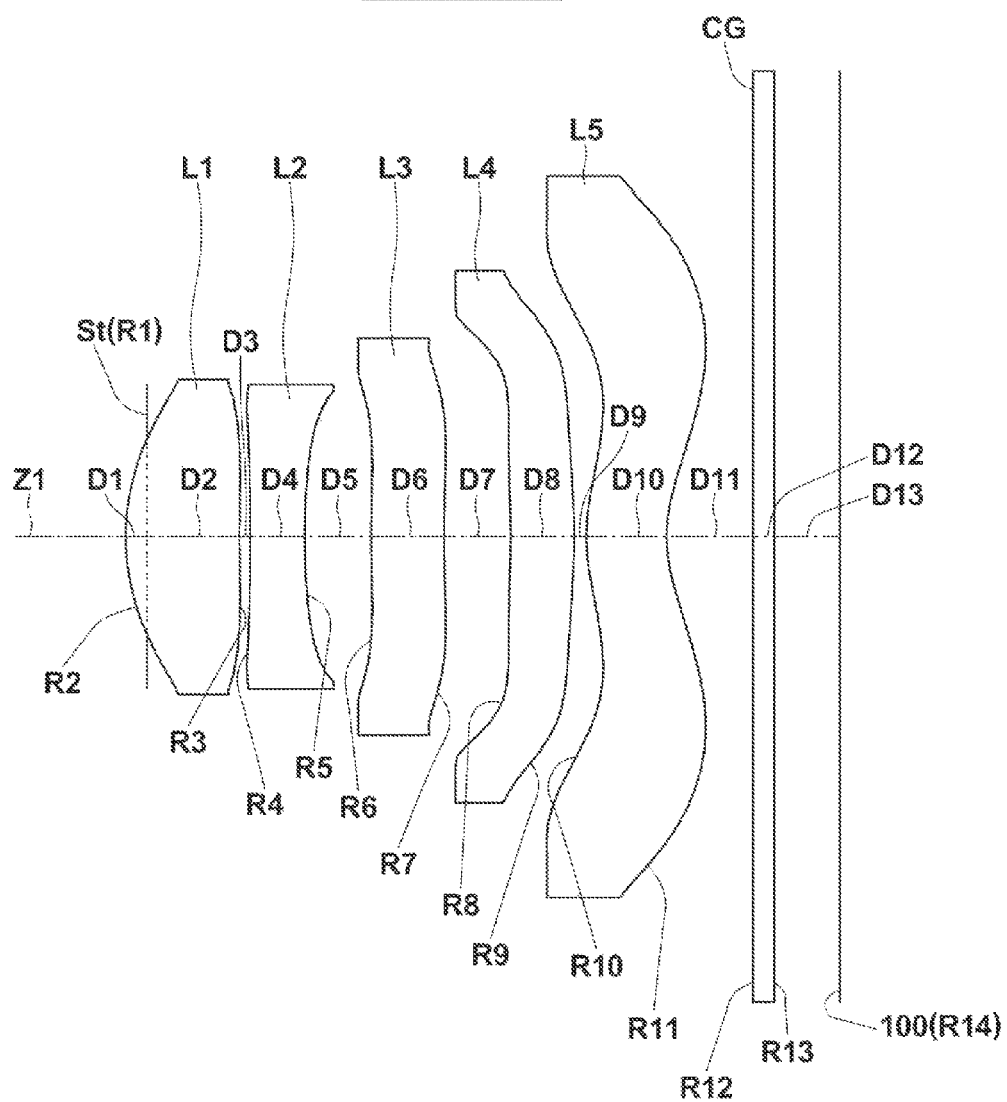
FIG. 8 is a sectional diagram that illustrates an eighth example of the configuration of an imaging lens according to an embodiment of the present invention and corresponds to a lens of Example 8.
Figure 9:
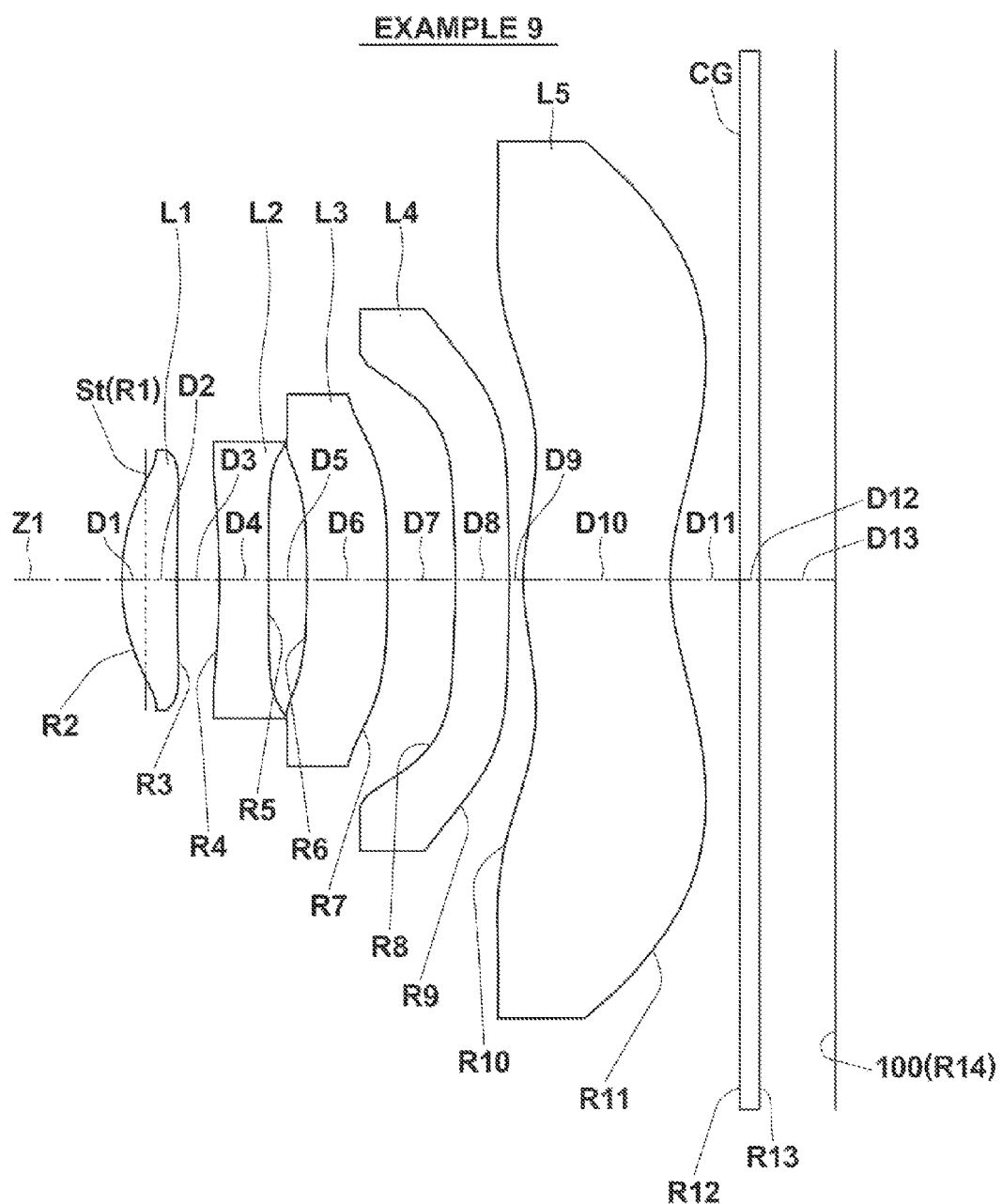
FIG. 9 is a sectional diagram that illustrates a ninth example of the configuration of in imaging lens according to an embodiment of the present invention, and corresponds to a lens of Example 9.

Specific lens data corresponding to the configuration of the imaging lens illustrated in FIG. 2 as Example 2 are shown in Table 3 and Table 4, in the same manner as for the imaging lens of Example 1. Similarly, specific data corresponding to the configurations of the imaging lenses illustrated in FIG. 3 through FIG. 9 are shown in Tables 5 through 18. In the imaging lenses of Examples 1 through 9, both of the surfaces of the first lens L1 through the fifth lens L5 are all aspherical surfaces.

Figure 10:
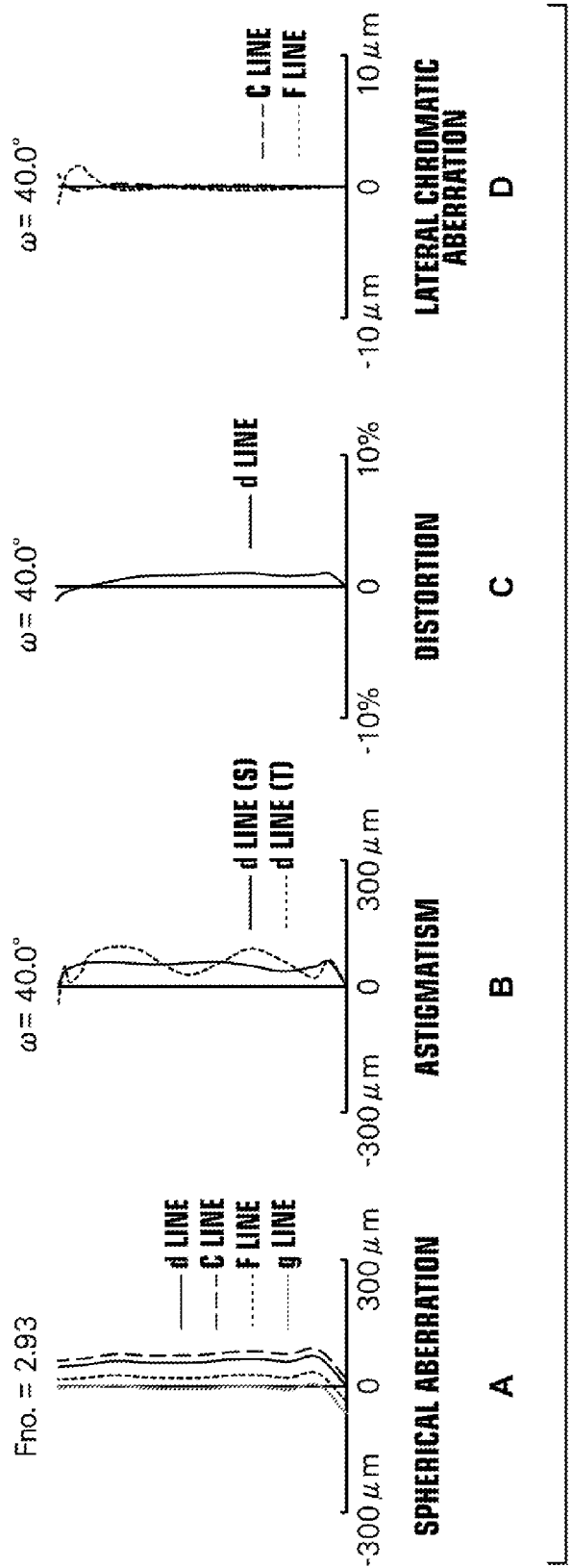
FIG. 10 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 10 are diagrams that illustrate the spherical aberration, the astigmatic aberration, the distortion the lateral chromatic aberration (chromatic aberration according to magnification rate) of the imaging lens of Example 1, respectively. Each of the diagrams that illustrate the spherical aberration, the astigmatic aberration (field curvature), and the distortion illustrate aberrations using the d line (wavelength: 587.56 nm) as a reference wavelength. The diagrams that illustrate spherical aberration and lateral chromatic aberration also show aberrations related to the F line (wavelengths: 486.1 nm) and the C line (wavelength: 656.27 nm). Ina addition, the diagram that illustrates spherical aberration also show aberrations related to the g line (wavelength: 435.83 nm). In the diagram that illustrates astigmatic aberration, aberrations in the sagittal direction (S) are indicated by solid lines, while aberrations in the tangential direction (T) are indicated by broken lines. In addition, "Fno." denotes an F number, and "ω" denotes a half angle of view.

Figure 11:
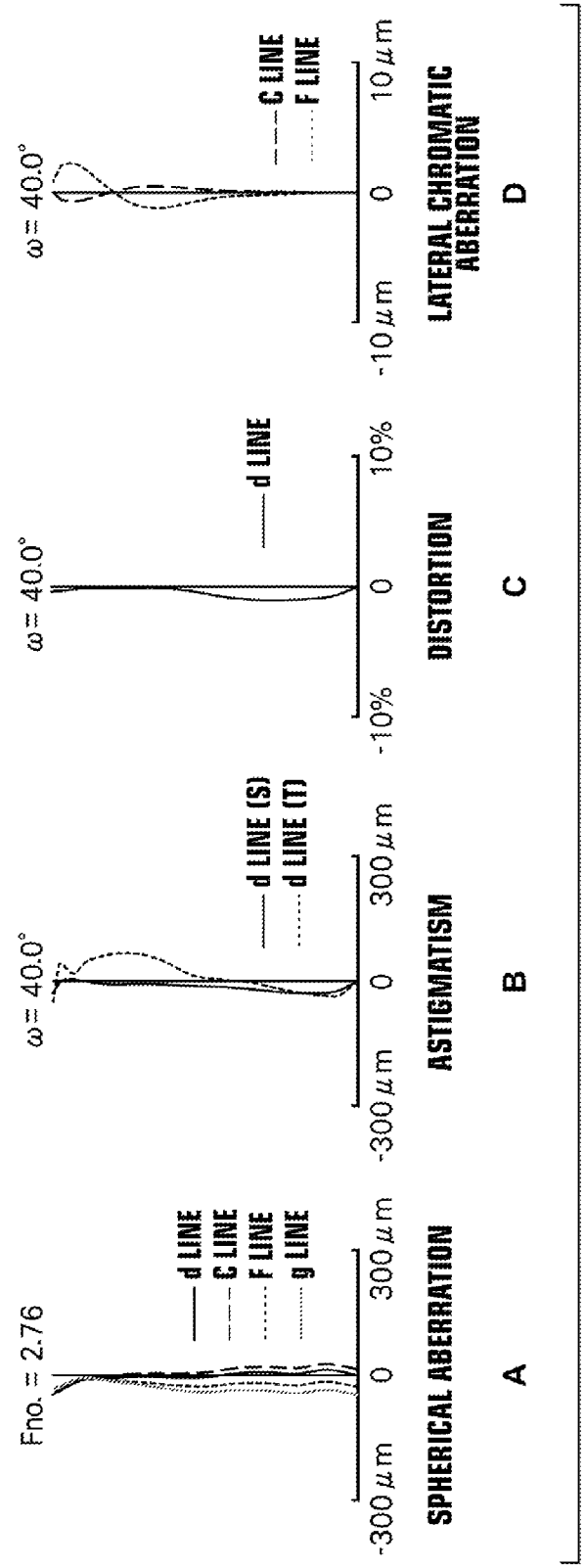
FIG. 11 is a collection of diagrams that illustrate aberrations of the imaging lens of Example 2, wherein A illustrates spherical aberration. B illustrates astigmatic aberration (field curvature), C illustrates distortion, and D illustrates lateral chromatic aberration.
Figure 12:
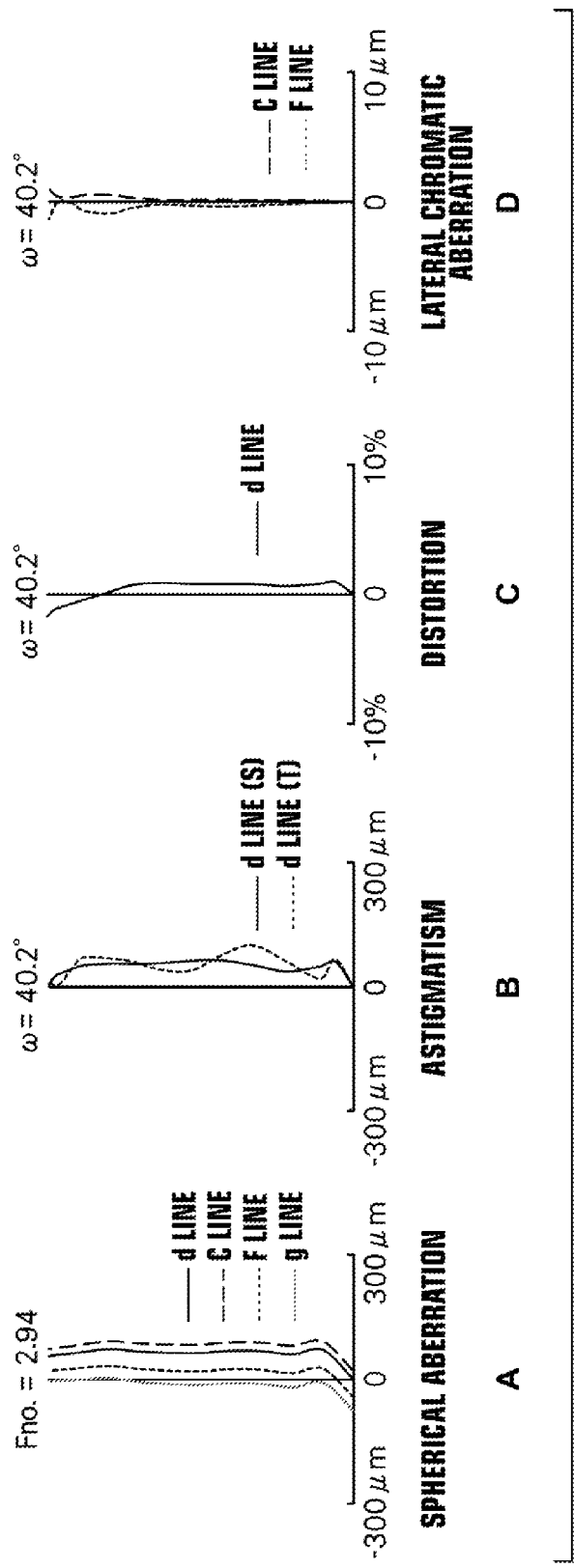
FIG. 12 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 13:
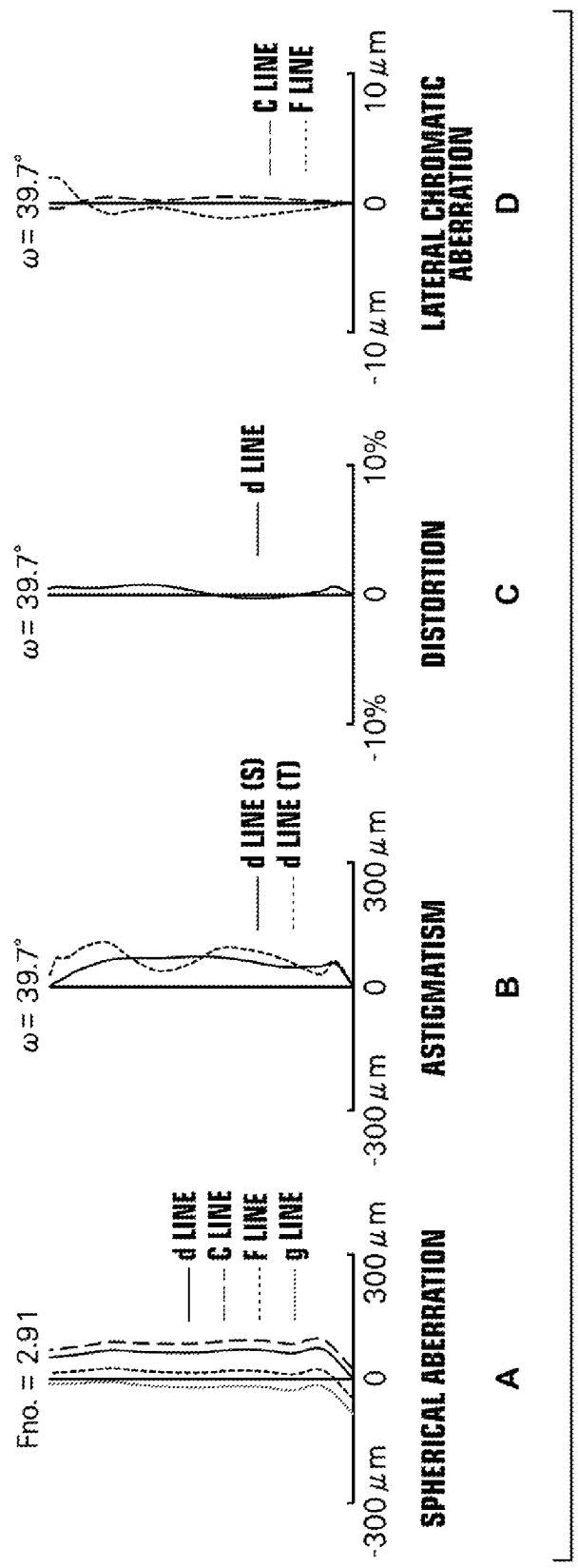
FIG. 13 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.
Figure 14:
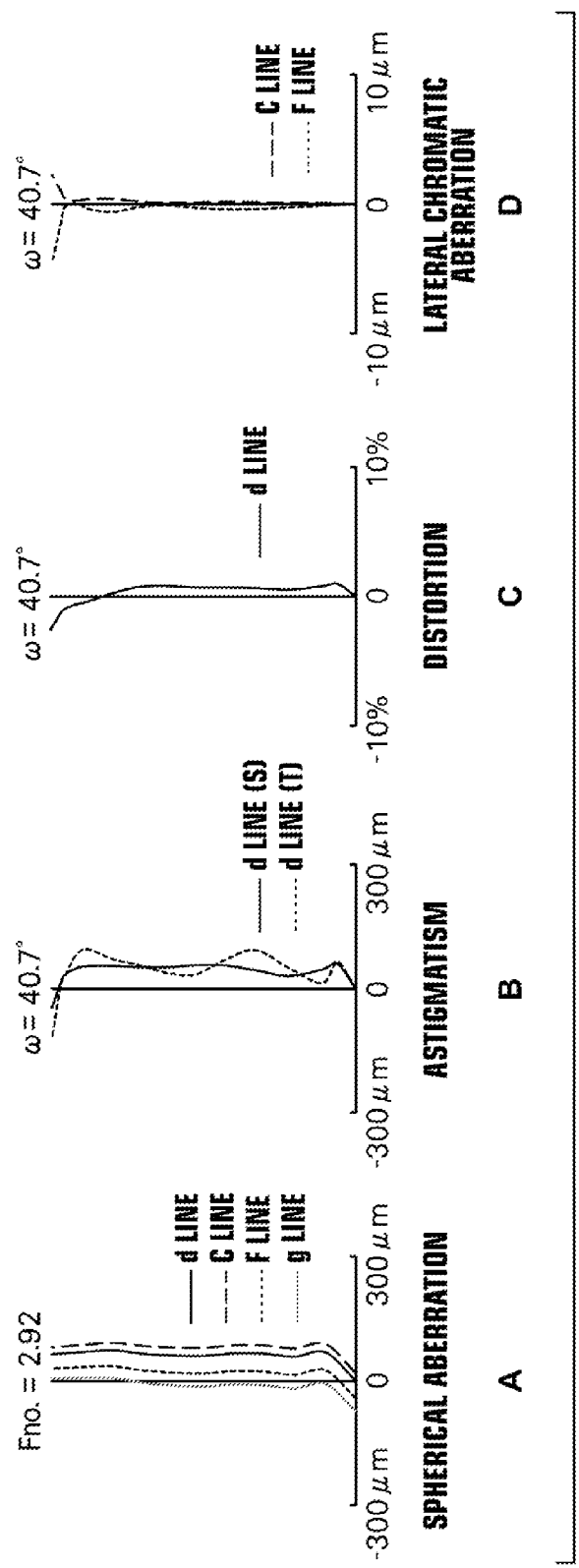
FIG. 14 is a collection of diagrams that illustrate aberrations of the imaging lens of Example 5, wherein A illustrates spherical aberration, B illustrates astigmatic aberration (field curvature), C illustrates distortion, and D illustrates lateral chromatic aberration.
Figure 15:
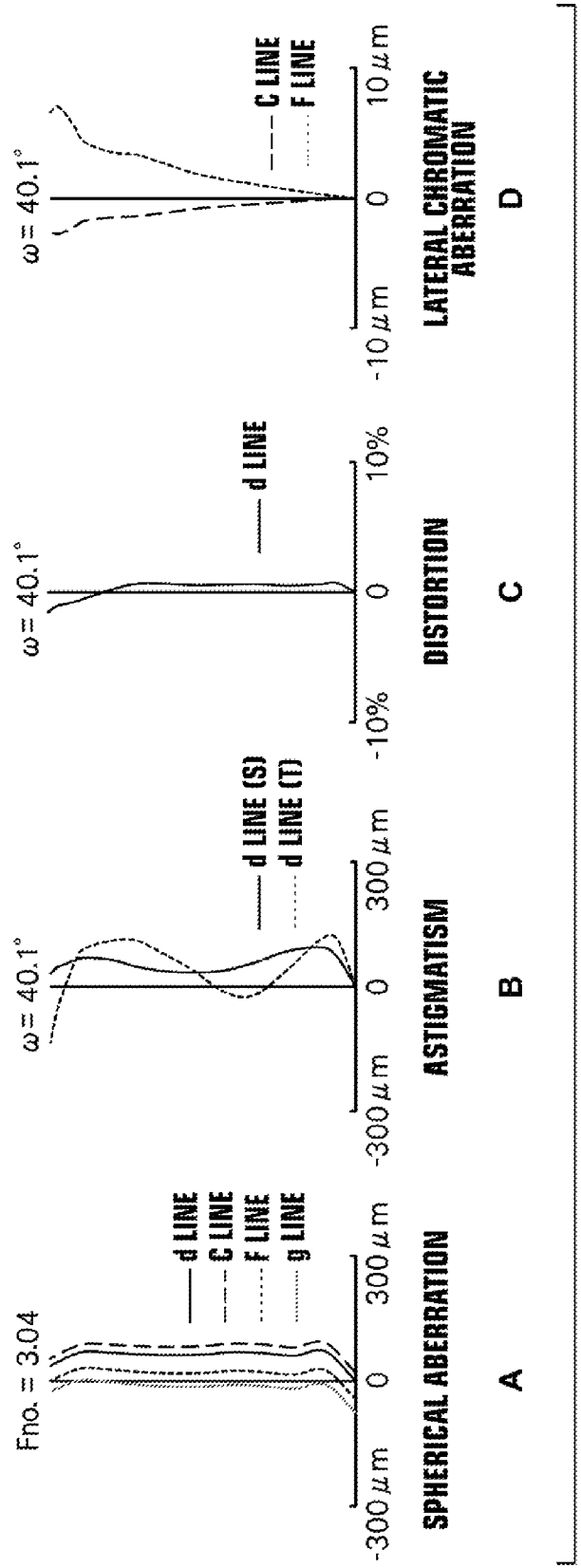
FIG. 15 is a collection of diagrams that illustrate aberrations of the imaging lens of Example 6, wherein A illustrates spherical aberration, B illustrates astigmatic aberration (field curvature), C illustrates distortion, and D illustrates lateral chromatic aberration.
Figure 16:
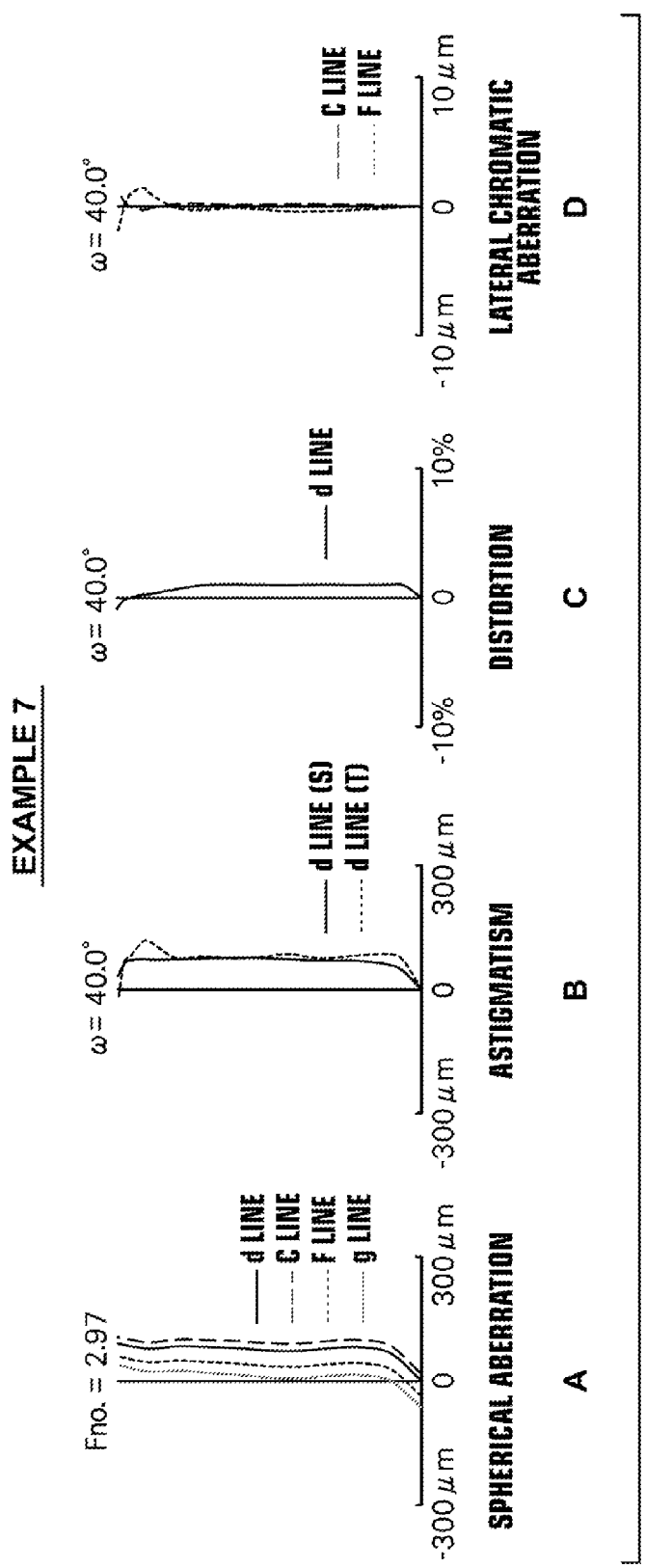
FIG. 16 is a collection of diagrams that illustrate aberrations of the imaging lens of Example 7, wherein A illustrates spherical aberration, B illustrates astigmatic aberration (field curvature), C illustrates distortion, and D illustrates lateral chromatic aberration.
Figure 17:
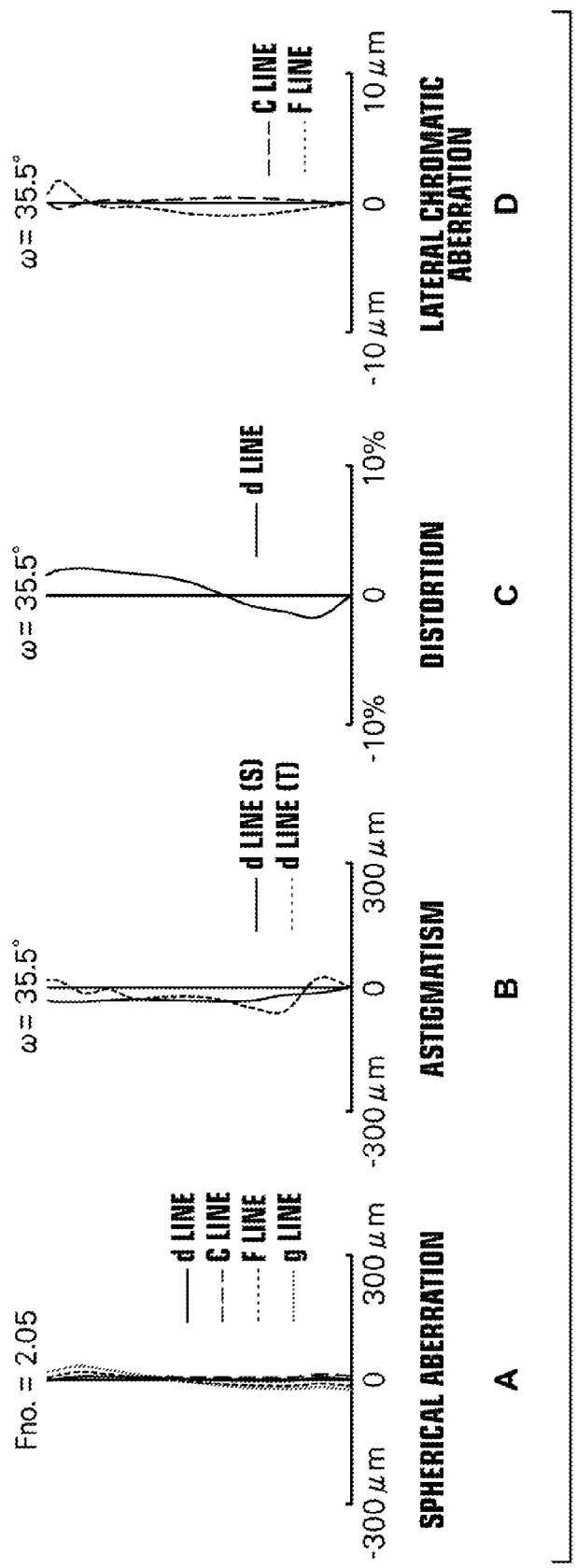
FIG. 17 is a collection of diagrams that illustrate aberrations of the imaging lens of Example 8, wherein A illustrates spherical aberration, B illustrates astigmatic aberration (field curvature), C illustrates distortion, and D illustrates lateral chromatic aberration.
Figure 18:
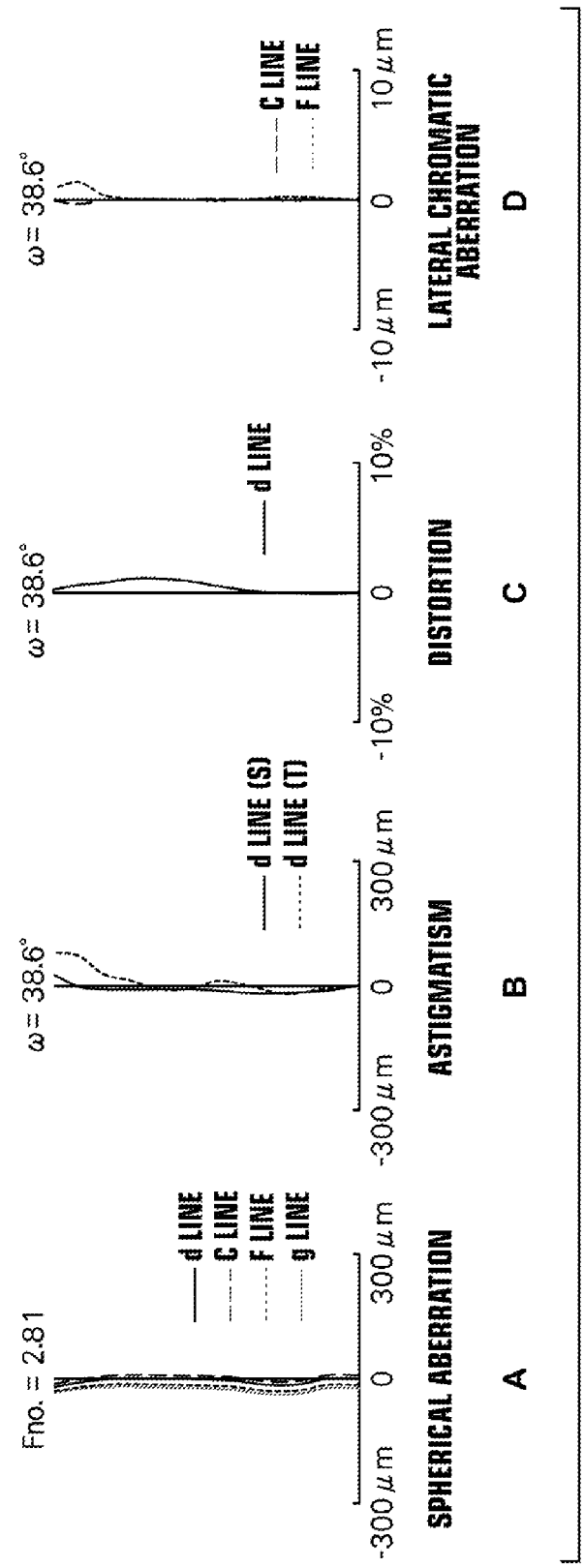
FIG. 18 is a collection of diagrams that illustrate aberrations of the imaging lens of Example 9, wherein A illustrates spherical aberration, B illustrates astigmatic aberration (field curvature), C illustrates distortion, and D illustrates lateral chromatic aberration.

Similarly, the aberrations of the imaging lens of Example 2 are illustrated in A through D of FIG. 11. Similarly, the aberrations of the imaging lenses of Example 3 through Example 9 are illustrated in A through D of FIG. 12 through A through D of FIG. 18.

In addition, Table 19 shows values corresponding to Conditional Formulae (1) through (5), respectively summarized for each of Examples 1 through 9.

As can be understood from each set of numerical value data and from the diagrams that illustrate aberrations, each of the Examples realizes a shortening of the total length, a widening of the angle of view, and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc. of each lens component are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.45, Bf = 1.02

| Si | Ri | Di | Ndj | vdj |
|---|---|---|---|---|
| 1 (aperture stop) | ∞ | −0.17 | | |
| *2 | 1.5511 | 0.58 | 1.53391 | 55.89 |
| *3 | 8.6905 | 0.24 | | |
| *4 | −32.4623 | 0.35 | 1.63351 | 23.63 |
| *5 | 31.7953 | 0.30 | | |
| *6 | −3.7748 | 0.53 | 1.53391 | 55.89 |
| *7 | −5.2097 | 0.36 | | |
| *8 | 10.2333 | 0.41 | 1.63351 | 23.63 |
| *9 | 6.3323 | 0.17 | | |
| *10 | 3.2557 | 1.03 | 1.53391 | 55.89 |
| *11 | 2.0591 | 0.49 | | |
| 12 | ∞ | 0.14 | 1.51633 | 64.14 |
| 13 | ∞ | 0.44 | | |
| 14 (imaging plane) | ∞ | | | |

*aspherical surface

TABLE 3

Example 2
f = 4.42, Bf = 0.87

| Si | Ri | Di | Ndj | vdj |
|---|---|---|---|---|
| 1 (aperture stop) | ∞ | −0.17 | | |
| *2 | 1.3676 | 0.53 | 1.53391 | 55.89 |
| *3 | 6.7342 | 0.12 | | |
| *4 | −17.4646 | 0.43 | 1.63351 | 23.63 |
| *5 | 13.9976 | 0.52 | | |
| *6 | 19.9486 | 0.49 | 1.53391 | 55.89 |
| *7 | 10.1791 | 0.45 | | |
| *8 | 33.6301 | 0.61 | 1.63351 | 23.63 |
| *9 | 7.1150 | 0.12 | | |
| *10 | 1.8921 | 0.49 | 1.53391 | 55.89 |
| *11 | 1.2625 | 0.49 | | |
| 12 | ∞ | 0.14 | 1.51633 | 64.14 |
| 13 | ∞ | 0.28 | | |
| 14 (imaging plane) | ∞ | | | |

*aspherical surface

TABLE 2

Example 1: Aspherical Surface Data

| Surface Number | KA | A3 | A4 | A5 | A6 |
|---|---|---|---|---|---|
| 2 | −2.0072549E+01 | −2.9413865E−03 | 2.5331546E−01 | 7.0706979E+00 | −5.4414575E+01 |
| 3 | −4.6158574E+01 | 1.1374786E−02 | −5.9917600E−01 | 7.3459745E+00 | −4.9315057E+01 |
| 4 | −8.9140438E+00 | 5.5343295E−02 | −1.4875844E+00 | 1.5191701E+01 | −8.5475190E+01 |
| 5 | −8.1538346E+01 | 1.6421399E−01 | −3.8914815E+00 | 3.8426046E+01 | −2.0675929E+02 |
| 6 | −2.4073541E+01 | −6.6467880E−02 | 4.9895013E−01 | −5.1944400E+01 | 3.0118782E+01 |
| 7 | −7.8814328E+00 | 4.2910877E−02 | −2.8496045E−01 | 4.0916252E+01 | −7.1697180E−02 |
| 8 | −9.3765955E+00 | 7.2644293E−02 | 1.4855972E−01 | −2.3241986E+00 | 1.0681493E+01 |
| 9 | 1.7200086E+00 | 7.8755398E−02 | 7.9589426E−02 | −1.0659322E+00 | 3.0377980E+00 |
| 10 | −7.3203770E+00 | 3.3937723E−02 | 1.8688590E−02 | −1.1443793E+00 | 2.3382133E+00 |
| 11 | −5.7108557E+00 | 1.3841463E−01 | −7.2724738E−01 | 1.5293666E+00 | −2.2181504E+00 |

| | A7 | A8 | A9 | A10 | A11 |
|---|---|---|---|---|---|
| 2 | 2.1637196E+02 | −5.4095232E+02 | 8.6807658E+02 | −8.6514297E+02 | 4.8675836E+02 |
| 3 | 1.9545399E+02 | −4.8589049E+02 | 7.6579088E+02 | −7.4401243E+02 | 4.0677650E+02 |
| 4 | 2.9486028E+02 | −6.5313258E+02 | 9.3476730E+02 | −8.3727070E+02 | 4.2743811E+02 |
| 5 | 6.8043302E+02 | −1.4307213E+03 | 1.9339180E+03 | −1.6279172E+03 | 7.7723707E+02 |
| 6 | −1.1374511E+02 | 2.7334857E+02 | −4.1514548E+02 | 3.8648453E+02 | −2.0178484E+02 |
| 7 | −1.3928967E+00 | 1.7638750E+00 | 7.3679687E−01 | −2.9137365E+00 | 2.1143157E+00 |
| 8 | −2.6919194E+01 | 4.0369801E+01 | −3.7591356E+01 | 2.1440927E+01 | −6.8844643E+00 |
| 9 | −5.1076591E+00 | 5.2562059E+00 | −3.3550094E+00 | 1.2980942E+00 | −2.7775688E−01 |
| 10 | −2.4912111E+00 | 1.6435245E+00 | −6.7018399E−01 | 1.5942270E−01 | −1.9426755E−02 |
| 11 | 2.1597557E+00 | −1.3945215E+00 | 5.8970746E−01 | −1.5700787E−01 | 2.3832221E−02 |

| | A12 |
|---|---|
| 2 | −1.1807964E+02 |
| 3 | −9.5804167E+01 |
| 4 | −9.5004225E+01 |
| 5 | −1.6077023E+02 |
| 6 | 4.5379316E+01 |
| 7 | −5.0887481E−01 |
| 8 | 9.5512597E−01 |
| 9 | 2.5055339E−02 |
| 10 | 8.5205286E−04 |
| 11 | −1.5677000E−03 |

TABLE 4

Example 2: Aspherical Surface Data

| Surface Number | KA | A3 | A4 | A5 | A6 |
|---|---|---|---|---|---|
| 2 | -1.4781042E+01 | -1.1634549E-01 | 1.5238075E+00 | -1.7620241E+00 | -7.0534603E+00 |
| 3 | -8.1815583E+01 | -7.7590865E-02 | 4.5727321E-01 | -1.6146745E+00 | 4.5289264E-01 |
| 4 | -5.8321446E+01 | 8.2667075E-02 | -5.8012813E-01 | 1.1884436E+00 | -3.4685795E-01 |
| 5 | -5.7565895E+01 | 3.6328172E-02 | -1.1259771E-01 | 2.7600713E-01 | -2.9158933E-01 |
| 6 | -3.0706279E+01 | 2.7864078E-03 | -3.8997717E-02 | -3.4579209E-01 | 5.5918355E-01 |
| 7 | -2.1553180E+01 | 4.3935810E-02 | -3.6310448E-01 | 7.4639183E-01 | -8.0766045E-01 |
| 8 | -2.0470350E+01 | 1.1247439E-01 | -5.4117797E-01 | 1.3945048E+00 | -2.4061740E+00 |
| 9 | 5.9193024E+00 | -6.5203410E-02 | 1.0819713E+00 | -5.7906770E-01 | 1.4051863E+00 |
| 10 | -1.0867386E+01 | -6.1153087E-02 | -3.5376775E-01 | 1.8370931E-01 | 7.8341392E-02 |
| 11 | -6.2597679E+00 | 5.1949213E-02 | -5.7257869E-01 | 9.5566554E-01 | -1.0415887E+00 |

| | A7 | A8 | A9 | A10 | A11 |
|---|---|---|---|---|---|
| 2 | 3.2515472E+01 | -5.5968799E+01 | 5.2393865E+01 | -8.6655097E+01 | 2.3385806E+02 |
| 3 | 5.4117680E+00 | 1.2530110E+00 | -3.8954857E+01 | 4.2526874E+01 | 5.0610809E+01 |
| 4 | -2.1880290E+00 | -6.2107966E-01 | 1.1230891E+01 | -1.2384158E+01 | -4.7429424E+00 |
| 5 | 1.1612069E+00 | -1.6606693E+00 | -2.0603835E+00 | 6.4605980E+00 | -1.6970361E-01 |
| 6 | -3.0418895E-01 | 2.7233069E-01 | -2.7180815E-01 | -1.1634981E+00 | 1.5954013E+00 |
| 7 | -1.2738526E+00 | 4.5297906E+00 | -4.5548596E+00 | 1.2943236E+00 | 3.7534718E-01 |
| 8 | 2.1559181E+00 | -1.3640853E+00 | 1.0722859E+00 | 6.6198024E-01 | 6.9927847E-02 |
| 9 | -2.1859348E+00 | 1.9877857E+00 | -9.9405734E-01 | 2.2094601E-01 | -2.3816021E-02 |
| 10 | 1.3174842E-01 | -3.3050030E-01 | 1.7297712E-01 | 2.8720512E-03 | -1.8615776E-02 |
| 11 | 7.8589257E-01 | -3.6018993E-01 | 9.7165370E-02 | -3.9956159E-02 | 3.2119018E-02 |

| | A12 | A13 | A14 | A15 | A16 |
|---|---|---|---|---|---|
| 2 | -3.6262118E+02 | 3.3834281E+02 | -2.6523655E+02 | 1.8512858E+02 | -6.4809852E+01 |
| 3 | -1.0333322E+02 | 8.7042123E+00 | 6.3759061E+01 | -2.6007955E+01 | -3.5838575E+01 |
| 4 | 2.0518819E+01 | -2.2483798E+00 | 1.8623386E+01 | -1.1173869E+01 | 2.8806833E+00 |
| 5 | -6.8076913E+00 | -1.2550737E-00 | 7.1573807E+00 | -5.0261250E-01 | -2.0234852E+00 |
| 6 | 9.1183973E-01 | -1.8832308E+00 | -1.1423269E-02 | 8.6132506E-01 | -2.9630266E-01 |
| 7 | 3.4290301E-01 | -6.1655721E-01 | 1.4208489E-01 | 6.0237036E-02 | -2.1131694E-02 |
| 8 | 3.1701971E-01 | 1.7678780E-01 | -1.6140971E-01 | 4.7374546E-01 | -4.2790562E-03 |
| 9 | 5.4716074E-02 | -5.1927780E-02 | 2.0984764E-02 | -4.1376161E-03 | 3.3301456E-04 |
| 10 | -3.4233469E-03 | 4.0015076E-03 | -4.2756864E-04 | -1.4600344E-04 | 2.5791402E-05 |
| 11 | -1.4853474E-02 | 3.1066876E-03 | -1.4931643E-04 | -3.8123457E-05 | 4.0358420E-06 |

TABLE 5

Example 3
f = 4.45, Bf = 1.03

| Si | Ri | Di | Ndj | vdj |
|---|---|---|---|---|
| 1 (aperture stop) | ∞ | -0.17 | | |
| *2 | 1.5435 | 0.56 | 1.53391 | 55.89 |
| *3 | 6.3980 | 0.19 | | |
| *4 | 75.2540 | 0.43 | 1.63351 | 23.63 |
| *5 | 63.1217 | 0.33 | | |
| *6 | -2.6549 | 0.56 | 1.53391 | 55.89 |
| *7 | -2.9146 | 0.31 | | |
| *8 | 9.1857 | 0.35 | 1.63351 | 23.63 |
| *9 | 5.0038 | 0.25 | | |
| *10 | 3.8891 | 0.97 | 1.53391 | 55.89 |
| *11 | 2.0400 | 0.49 | | |
| 12 | ∞ | 0.14 | 1.51633 | 64.14 |
| 13 | ∞ | 0.44 | | |
| 14 (imaging plane) | ∞ | | | |

*aspherical surface

TABLE 6

Example 3: Aspherical Surface Data

| Surface Number | KA | A3 | A4 | A5 | A6 |
|---|---|---|---|---|---|
| 2 | -1.9787292E+01 | -2.9413865E-03 | 2.5331546E-01 | 7.0706979E-00 | -5.4414575E+01 |
| 3 | -2.1458027E+01 | 1.1374786E-02 | -5.9917600E-01 | 7.3459745E+00 | -4.9315057E+01 |
| 4 | -8.1500009E+01 | 5.5343295E-02 | -1.4875844E+00 | 1.5191701E+01 | -8.5475190E+01 |
| 5 | 1.7300000E+00 | 1.6421399E-01 | -3.8914815E+00 | 3.8426046E+01 | -2.0675929E+02 |
| 6 | -1.2490028E+01 | -6.6467880E-02 | 4.9895013E-01 | -5.1944400E+00 | 3.0118782E+01 |
| 7 | -1.1369122E+01 | 4.2910877E-02 | -2.8496045E-01 | 4.0916252E-01 | -7.1697180E-02 |
| 8 | -6.4028483E+00 | 7.2644293E-02 | 1.4855972E-01 | -2.3241986E+00 | 1.0681493E+01 |
| 9 | -2.3912604E+00 | 7.8755398E-02 | 7.9589426E-02 | -1.0659322E+00 | 3.0377980E+00 |
| 10 | -8.3271503E+00 | 3.3937723E-02 | 1.8688590E-02 | -1.1443793E+00 | 2.3382133E+00 |
| 11 | -6.7380229E+00 | 1.3841463E-01 | -7.2724738E-01 | 1.5293666E+00 | -2.2181504E+00 |

TABLE 6-continued

Example 3: Aspherical Surface Data

|    | A7            | A8            | A9            | A10           | A11           |
|----|---------------|---------------|---------------|---------------|---------------|
| 2  | 2.1637196E+02 | −5.4095232E+02 | 8.6807658E+02 | −8.6514297E+02 | 4.8675836E+02 |
| 3  | 1.9545399E+02 | −4.8589049E+02 | 7.6579088E+02 | −7.4401243E+02 | 4.0677650E+02 |
| 4  | 2.9486028E+02 | −6.5313258E+02 | 9.3476730E+02 | −8.3727070E+02 | 4.2743811E+02 |
| 5  | 6.8043302E+02 | −1.4307213E+03 | 1.9339180E+03 | −1.6279172E+03 | 7.7723707E+02 |
| 6  | −1.1374511E+02 | 2.7334857E+02 | −4.1514548E+02 | 3.8648453E+02 | −2.0178484E+02 |
| 7  | −1.3928967E+00 | 1.7638750E+00 | 7.3679687E−01 | −2.9137365E+00 | 2.1143157E+00 |
| 8  | −2.6919194E+01 | 4.0369801E+01 | −3.7591356E+01 | 2.1440927E+01 | −6.8844643E+00 |
| 9  | −5.1076591E+00 | 5.2562059E+00 | −3.3350094E+00 | 1.2980942E+00 | −2.7775688E−01 |
| 10 | −2.4912111E+00 | 1.6435245E+00 | −6.7018399E−01 | 1.5942270E−01 | −1.9426755E−02 |
| 11 | 2.1597557E+00 | −1.3945215E+00 | 5.8970746E−01 | −1.5700787E−01 | 2.3832221E−02 |

|    | A12           |
|----|---------------|
| 2  | −1.1807964E+02 |
| 3  | −9.5804167E+01 |
| 4  | −9.5004225E+01 |
| 5  | −1.6077023E+02 |
| 6  | 4.5379316E+01 |
| 7  | −5.0887481E−01 |
| 8  | 9.5512597E−01 |
| 9  | 2.5055339E−02 |
| 10 | 8.5205286E−04 |
| 11 | −1.5677000E−03 |

TABLE 7

Example 4
f = 4.42, Bf = 0.74

| Si | Ri | Di | Ndj | vdj |
|---|---|---|---|---|
| 1 (aperture stop) | ∞ | −0.17 | | |
| *2 | 1.5434 | 0.56 | 1.53391 | 55.89 |
| *3 | 5.9125 | 0.19 | | |
| *4 | 91.7347 | 0.43 | 1.63351 | 23.63 |
| *5 | 32.1957 | 0.29 | | |
| *6 | −3.7575 | 0.45 | 1.53391 | 55.89 |
| *7 | −4.7219 | 0.40 | | |
| *8 | 2.3088 | 0.35 | 1.63351 | 23.63 |
| *9 | 2.1727 | 0.50 | | |
| *10 | 10.3185 | 0.95 | 1.53391 | 55.89 |
| *11 | 2.3105 | 0.49 | | |
| 12 | ∞ | 0.14 | 1.51633 | 64.14 |
| 13 | ∞ | 0.16 | | |
| 14 (imaging plane) | ∞ | | | |

*aspherical surface

TABLE 8

Example 4: Aspherical Surface Data

| Surface Number | KA | A3 | A4 | A5 | A6 |
|---|---|---|---|---|---|
| 2 | −1.9850845E+01 | −2.9413865E−03 | 2.5331546E−01 | 7.0706979E+00 | −5.4414575E+01 |
| 3 | −1.7295654E+01 | 1.1374786E−02 | −5.9917600E−01 | 7.3459745E+00 | −4.9315057E+01 |
| 4 | −7.9643488E+01 | 5.5343295E−02 | −1.4875844E+00 | 1.5191701E+01 | −8.5475190E+01 |
| 5 | −8.0321597E+01 | 1.6421399E−01 | −3.8914815E+00 | 3.8426046E+01 | −2.0675929E+02 |
| 6 | −4.9154330E+01 | −6.6467880E−02 | 4.9895013E−01 | −5.1944400E+00 | 3.0118782E+01 |
| 7 | −2.6328502E+01 | 4.2910877E−02 | −2.8496045E−01 | 4.0916252E−01 | −7.1697180E−02 |
| 8 | −1.9198297E+01 | 7.2644293E−02 | 1.4855972E−01 | −2.3241986E+00 | 1.0681493E+01 |
| 9 | −1.3132944E+01 | 7.8755398E−02 | 7.9589426E−02 | −1.0659322E+00 | 3.0377980E+00 |
| 10 | −1.0754781E+00 | 3.3937723E−02 | 1.8688590E−02 | −1.1443793E+00 | 2.3382133E+00 |
| 11 | −1.3034647E+01 | 1.3841463E−01 | −7.2724738E−01 | 1.5293666E+00 | −2.2181504E+00 |

|    | A7            | A8            | A9            | A10           | A11           |
|----|---------------|---------------|---------------|---------------|---------------|
| 2  | 2.1637196E+02 | −5.4095232E+02 | 8.6807658E+02 | −8.6514297E+02 | 4.8675836E+02 |
| 3  | 1.9545399E+02 | −4.8589049E+02 | 7.6579088E+02 | −7.4401243E+02 | 4.0677650E+02 |
| 4  | 2.9486028E+02 | −6.5313258E+02 | 9.3476730E+02 | −8.3727070E+02 | 4.2743811E+02 |
| 5  | 6.8043302E+02 | −1.4307213E+03 | 1.9339180E+03 | −1.6279172E+03 | 7.7723707E+02 |
| 6  | −1.1374511E+02 | 2.7334857E+02 | −4.1514548E+02 | 3.8648453E+02 | −2.0178484E+02 |
| 7  | −1.3928967E+00 | 1.7638750E+00 | 7.3679687E−01 | −2.9137365E+00 | 2.1143157E+00 |
| 8  | −2.6919194E+01 | 4.0369801E+01 | −3.7591356E+01 | 2.1440927E+01 | −6.8844643E+00 |
| 9  | −5.1076591E+00 | 5.2562059E+00 | −3.3350094E+00 | 1.2980942E+00 | −2.7775688E−01 |

TABLE 8-continued

Example 4: Aspherical Surface Data

| | | | | | |
|---|---|---|---|---|---|
| 10 | −2.4912111E+00 | 1.6435245E+00 | −6.7018399E−01 | 1.5942270E−01 | −1.9426755E−02 |
| 11 | 2.1597557E+00 | −1.3945215E+00 | 5.8970746E−01 | −1.5700787E−01 | 2.3832221E−02 |

| | A12 |
|---|---|
| 2 | −1.1807964E+02 |
| 3 | −9.5804167E+01 |
| 4 | −9.5004225E+01 |
| 5 | −1.6077023E+02 |
| 6 | 4.5379316E+01 |
| 7 | −5.0887481E−01 |
| 8 | 9.5512597E−01 |
| 9 | 2.5055339E−02 |
| 10 | 8.5205286E−04 |
| 11 | −1.5677000E−03 |

TABLE 9

Example 5
f = 4.41, Bf = 1.09

| Si | Ri | Di | Ndj | νdj |
|---|---|---|---|---|
| 1 (aperture stop) | ∞ | −0.17 | | |
| *2 | 1.5492 | 0.57 | 1.53391 | 55.89 |
| *3 | 6.6762 | 0.17 | | |
| *4 | 50.9444 | 0.43 | 1.63351 | 23.63 |
| *5 | 33.8194 | 0.33 | | |
| *6 | −2.7418 | 0.57 | 1.53391 | 55.89 |
| *7 | −3.3741 | 0.28 | | |
| *8 | 8.7593 | 0.37 | 1.63351 | 23.63 |
| *9 | 4.9598 | 0.21 | | |
| *10 | 2.8330 | 0.95 | 1.53391 | 55.89 |
| *11 | 1.8559 | 0.49 | | |
| 12 | ∞ | 0.14 | 1.51633 | 64.14 |
| 13 | ∞ | 0.51 | | |
| 14 (imaging plane) | ∞ | | | |

*aspherical surface

TABLE 10

Example 5: Aspherical Surface Data

| Surface Number | KA | A3 | A4 | A5 | A6 |
|---|---|---|---|---|---|
| 2 | −2.0032323E+01 | −2.9413865E−03 | 2.5331546E−01 | 7.0706979E+00 | −5.4414575E+01 |
| 3 | −2.7477914E+01 | 1.1374786E−02 | −5.9917600E−01 | 7.3459745E+00 | −4.9315057E+01 |
| 4 | −8.1500000E+01 | 5.5343295E−02 | −1.4875844E+00 | 1.5191701E+01 | −8.5475190E+01 |
| 5 | −8.1500000E+01 | 1.6421399E−01 | −3.8914815E+00 | 3.8426046E+01 | −2.0675929E+02 |
| 6 | −1.1623590E+01 | −6.6467880E−02 | 4.9895013E−01 | −5.1944400E+00 | 3.0118782E+01 |
| 7 | −8.4765064E+00 | 4.2910877E−02 | −2.8496045E−01 | 4.0916252E−01 | −7.1697180E−02 |
| 8 | 1.7300090E+00 | 7.2644293E−02 | 1.4855972E−01 | −2.3241986E+00 | 1.0681493E+01 |
| 9 | 1.7300028E+00 | 7.8755398E−02 | 7.9589426E−02 | −1.0659332E+00 | 3.0377980E+00 |
| 10 | −7.0801526E+00 | 3.3977723E−02 | 1.8688590E−02 | −1.1443793E+00 | 2.3382133E+00 |
| 11 | −6.2222122E+00 | 1.3841463E−01 | −7.2724738E−01 | 1.5293666E+00 | −2.2181504E+00 |

| | A7 | A8 | A9 | A10 | A11 |
|---|---|---|---|---|---|
| 2 | 2.1637196E+02 | −5.4095232E+02 | 8.6807658E+02 | −8.6514297E+02 | 4.8675836E+02 |
| 3 | 1.9545399E+02 | −4.8589049E+02 | 7.6579088E+02 | −7.4401243E+02 | 4.0677650E+02 |
| 4 | 2.9486028E+02 | −6.5313258E+02 | 9.3476730E+02 | −8.3727070E+02 | 4.2743811E+02 |
| 5 | 6.8043302E+02 | −1.4307213E+03 | 1.9339180E+03 | −1.6279172E+03 | 7.7723707E+02 |
| 6 | −1.1374511E+02 | 2.7334857E+02 | −4.1514548E+02 | 3.8648453E+02 | −2.0178484E+02 |
| 7 | −1.3928967E+00 | 1.7638750E+00 | 7.3679687E−01 | −2.9137365E+00 | 2.1143157E+00 |
| 8 | −2.6919194E+01 | 4.0369801E+01 | −3.7591356E+01 | 2.1440927E+01 | −6.8844643E+00 |
| 9 | −5.1076591E+00 | 5.2562059E+00 | −3.3550094E+00 | 1.2980942E+00 | −2.7775688E−01 |
| 10 | −2.4912111E+00 | 1.6435245E−00 | −6.7018399E−01 | 1.5942270E−01 | −1.9426755E−02 |
| 11 | 2.1597557E+00 | −1.3945215E+00 | 5.8970746E−01 | −1.5700787E−01 | 2.3832221E−02 |

| | A12 |
|---|---|
| 2 | −1.1807964E+02 |
| 3 | −9.5804167E+01 |
| 4 | −9.5004225E+01 |
| 5 | −1.6077023E+02 |
| 6 | 4.5379316E+01 |
| 7 | −5.0887481E−01 |
| 8 | 9.5512597E−01 |

TABLE 10-continued

Example 5: Aspherical Surface Data

| | |
|---|---|
| 9 | 2.5055339E−02 |
| 10 | 8.5205286E−04 |
| 11 | −1.5677000E−03 |

TABLE 11

Example 6
f = 4.45, Bf = 1.02

| Si | Ri | Di | Ndj | vdj |
|---|---|---|---|---|
| *1 | 1.5439 | 0.56 | 1.53391 | 55.89 |
| *2 | 6.3890 | 0.19 | | |
| *3 (aperture stop) | ∞ | 0.00 | | |
| *4 | 80.6127 | 0.43 | 1.63351 | 23.63 |
| *5 | 58.2074 | 0.33 | | |
| *6 | −2.7352 | 0.55 | 1.53391 | 55.89 |
| *7 | −3.0798 | 0.32 | | |
| *8 | 8.5249 | 0.35 | 1.63351 | 23.63 |
| *9 | 4.8736 | 0.25 | | |
| *10 | 3.7073 | 0.97 | 1.53391 | 55.89 |
| *11 | 2.0099 | 0.49 | | |
| 12 | ∞ | 0.14 | 1.51633 | 64.14 |
| 13 | ∞ | 0.44 | | |
| 14 (imaging plane) | ∞ | | | |

*aspherical surface

TABLE 13

Example 7
f = 4.44, Bf = 1.02

| Si | Ri | Di | Ndj | vdj |
|---|---|---|---|---|
| 1 (aperture stop) | ∞ | −0.17 | | |
| *2 | 1.4348 | 0.42 | 1.53391 | 55.89 |
| *3 | 6.7356 | 0.24 | | |
| *4 | −21.8698 | 0.35 | 1.63351 | 23.63 |
| *5 | 51.4993 | 0.32 | | |
| *6 | −3.6863 | 0.65 | 1.53391 | 55.89 |
| *7 | −5.7869 | 0.39 | | |
| *8 | 7.2800 | 0.39 | 1.63351 | 23.63 |
| *9 | 5.2358 | 0.17 | | |
| *10 | 3.3729 | 1.04 | 1.53391 | 55.89 |
| *11 | 2.1668 | 0.49 | | |
| 12 | ∞ | 0.14 | 1.51633 | 64.14 |
| 13 | ∞ | 0.44 | | |
| 14 (imaging plane) | ∞ | | | |

*aspherical surface

TABLE 12

Example 6: Aspherical Surface Data

| Surface Number | K | A3 | A4 | A5 | A6 |
|---|---|---|---|---|---|
| 1 | −1.9805637E+01 | −2.9413865E−03 | 2.5331546E−01 | 7.0706979E+00 | −5.4414575E+01 |
| 2 | −2.1802359E+01 | 1.1374786E−02 | −5.9917600E−01 | 7.3459745E+00 | −4.9315057E+01 |
| 4 | −8.1500006E+01 | 5.5343295E−02 | −1.4875844E+00 | 1.5191701E+01 | −8.5475190E+01 |
| 5 | −4.6381422E+00 | 1.6421399E−01 | −3.8914815E+00 | 3.8426046E+01 | −2.0675929E+02 |
| 6 | −1.3341229E+01 | −6.6467880E−02 | 4.9895013E−01 | −5.1944400E+00 | 3.0118782E+01 |
| 7 | −1.2588071E+01 | 4.2910877E−02 | −2.8496045E−01 | 4.0916252E−01 | −7.1697180E−02 |
| 8 | 1.7300090E+00 | 7.2644293E−02 | 1.4855972E−01 | −2.3241986E+00 | 1.0681493E+01 |
| 9 | −2.0146082E+00 | 7.8755398E−02 | 7.9589426E−02 | −1.0659322E+00 | 3.0377980E+00 |
| 10 | −8.3230876E+00 | 3.3937723E−02 | 1.8688590E−02 | −1.1443793E+00 | 2.3382133E+00 |
| 11 | −6.6085824E+00 | 1.3841463E−01 | −7.2724738E−01 | 1.5293666E+00 | −2.2181504E+00 |

| | A7 | A8 | A9 | A10 | A11 |
|---|---|---|---|---|---|
| 1 | 2.1637196E+02 | −5.4095232E+02 | 8.6807658E+02 | −8.6514297E+02 | 4.8675836E+02 |
| 2 | 1.9545399E+02 | −4.8589049E+02 | 7.6579088E+02 | −7.4401243E+02 | 4.0677650E+02 |
| 4 | 2.9486028E+02 | −6.5313258E+02 | 9.3476730E+02 | −8.3727070E+02 | 4.2743811E+02 |
| 5 | 6.8043302E+02 | −1.4307213E+03 | 1.9339180E+03 | −1.6279172E+03 | 7.7723707E+02 |
| 6 | −1.1374571E+02 | 2.7334857E+02 | −4.1514548E+02 | 3.8648453E+02 | −2.0178484E+02 |
| 7 | −1.3928967E+00 | 1.7638750E+00 | 7.3679687E−01 | −2.9137365E+00 | 2.1143157E+00 |
| 8 | −2.6919194E+01 | 4.0369801E+01 | −3.7591356E+01 | 2.1440927E+01 | −6.8844643E+00 |
| 9 | −5.1076591E+00 | 5.2562059E+00 | −3.3550094E+00 | 1.2980942E+00 | −2.7775688E−01 |
| 10 | −2.4912111E+00 | 1.6435245E+00 | −6.7018399E−01 | 1.5942270E−01 | −1.9426755E−02 |
| 11 | 2.1597557E+00 | −1.3945215E+00 | 5.8970746E−01 | −1.5700787E−01 | 2.3832221E−02 |

| | A12 |
|---|---|
| 1 | −1.1807964E+02 |
| 2 | −9.5804167E+01 |
| 4 | −9.5004225E+01 |
| 5 | −1.6077023E+02 |
| 6 | 4.5379316E+01 |
| 7 | −5.0887481E−01 |
| 8 | 9.5512597E−01 |
| 9 | 2.5055339E−02 |
| 10 | 8.5205286E−04 |
| 11 | −1.5677000E−03 |

TABLE 14

Example 7: Aspherical Surface Data

| Surface Number | K | A3 | A4 | A5 | A6 |
|---|---|---|---|---|---|
| 2 | −2.0052202E+01 | −3.2934704E−02 | 1.2549619E+00 | −2.2727448E+00 | 3.6170653E+00 |
| 3 | −4.6864670E+01 | −8.3793525E−03 | 3.8863133E−02 | 6.0319489E−02 | −2.7425350E+00 |
| 4 | −9.8056815E+00 | 1.2244657E−02 | −1.4299773E−01 | 6.4492137E−01 | −1.2430345E+00 |
| 5 | −8.4718445E+01 | 2.2937850E−02 | −3.2462395E−01 | 3.0119342E+00 | −1.6137402E+01 |
| 6 | −2.4078735E+01 | −6.2332977E−02 | 1.4078473E−02 | 4.8258299E−01 | −3.6966533E+00 |
| 7 | −8.0768341E+00 | 4.5409696E−02 | −3.6068152E−01 | 7.6109286E−01 | −1.1008364E+00 |
| 8 | −1.0047466E+01 | 4.8254831E−02 | 1.3157022E−01 | −1.8286910E+00 | 8.2410370E+00 |
| 9 | 1.7200149E+00 | 5.4469228E−02 | 6.8687904E−03 | −4.3219695E−01 | 8.7118689E−01 |
| 10 | −7.3461556E+00 | 8.3715516E−02 | −3.7946258E−01 | 2.0166795E−01 | −3.8217258E−01 |
| 11 | −5.8906219E+00 | 2.1061834E−01 | −1.0671028E+00 | 2.3349321E+00 | −3.3702934E+00 |

| Surface Number | A7 | A8 | A9 | A10 | A11 |
|---|---|---|---|---|---|
| 2 | −1.3417695E+01 | 3.4730260E+01 | −1.9836952E+01 | −1.2237553E+02 | 3.6565522E+02 |
| 3 | 1.4323307E+01 | −3.4470975E+01 | 3.5750888E+01 | 1.3563711E+00 | −2.5673688E+01 |
| 4 | −1.7379588E+00 | 1.5378832E+01 | −3.7055446E+01 | 4.3990984E+01 | −1.8470204E+01 |
| 5 | 5.4335013E+01 | −1.1838166E+02 | 1.8547671E+02 | −2.5643770E+02 | 3.4822177E+02 |
| 6 | 1.8508540E+00 | 3.0226028E+01 | −8.7365699E+01 | 8.3200984E+01 | 3.0718772E+01 |
| 7 | 9.5193405E−02 | 1.1846134E+00 | −2.1703192E−01 | −1.4765007E+00 | 1.0155791E+00 |
| 8 | −2.0821351E+01 | 3.0436659E+01 | −2.5586515E+01 | 1.0049191E+01 | 1.4186553E+00 |
| 9 | −1.1092652E+00 | 7.7200166E−01 | −1.1021412E+00 | −2.6190422E−01 | 2.2246870E−01 |
| 10 | 9.8103788E−01 | −1.1102309E+00 | 6.0748464E−01 | −1.0720031E−01 | −5.3528397E−02 |
| 11 | 3.1230063E+00 | −1.7317032E+00 | 4.3210171E−01 | 9.0077094E−02 | −1.0794651E−01 |

| Surface Number | A12 | A13 | A14 |
|---|---|---|---|
| 2 | −4.7669718E+02 | 3.1481205E+02 | −8.5630502E+01 |
| 3 | −8.0180188E+00 | 3.7193524E+01 | −1.8163076E+01 |
| 4 | −1.5977052E+01 | 2.2837857E+01 | −8.2302422E+00 |
| 5 | −3.7388534E+02 | 2.3925331E+02 | −6.5034193E+01 |
| 6 | −1.3087509E+02 | 1.0352078E+02 | −2.8112521E+01 |
| 7 | 2.6852802E−01 | −4.1170946E−01 | 9.2562267E−02 |
| 8 | −3.3125487E+00 | 1.3406425E+00 | −1.8985261E−01 |
| 9 | −7.7848923E−03 | 1.1864688E−02 | −5.0348182E−04 |
| 10 | 3.4457739E−02 | −7.4617290E−03 | 5.9266123E−04 |
| 11 | 3.6216676E−02 | −5.7946162E−03 | 3.7424645E−04 |

TABLE 15

Example 8
f = 4.19, Bf = 1.10

| Si | Ri | Di | Ndj | νdj |
|---|---|---|---|---|
| 1 (aperture stop) | ∞ | −0.14 | | |
| *2 | 1.5400 | 0.75 | 1.54400 | 58.00 |
| *3 | 12.7478 | 0.07 | | |
| *4 | 85.2161 | 0.36 | 1.63350 | 22.00 |
| *5 | 4.6432 | 0.44 | | |
| *6 | 8.9484 | 0.48 | 1.54400 | 58.00 |
| *7 | 8.5417 | 0.44 | | |
| *8 | −4.2511 | 0.42 | 1.63300 | 24.00 |
| *9 | −4.9101 | 0.08 | | |
| *10 | 1.2645 | 0.53 | 1.54400 | 58.00 |
| *11 | 0.9809 | 0.57 | | |
| 12 | ∞ | 0.14 | 1.51633 | 64.14 |
| 13 | ∞ | 0.43 | | |
| 14 (imaging plane) | ∞ | | | |

*aspherical surface

TABLE 16

Example 8: Aspherical Surface Data

| Surface Number | K | A3 | A4 | A5 | A6 |
|---|---|---|---|---|---|
| 2 | −1.6394781E+01 | 3.5080602E−03 | 5.0825261E−01 | 3.7527286E−01 | −2.2472907E+00 |
| 3 | −9.6865485E+01 | −1.6391861E−02 | −1.2129920E−01 | 4.2354338E−01 | −1.8311690E+00 |
| 4 | −9.9999080E−01 | −1.8772874E−02 | 2.4374023E−01 | −4.0320094E+00 | 2.2441530E+01 |
| 5 | 9.2465704E−01 | 7.2529947E−02 | −4.8585638E−01 | 1.5746049E+00 | −2.2620428E+00 |
| 6 | −1.4593213E+02 | −6.2699502E−02 | 4.1935633E−01 | −1.8117072E+00 | 3.0581905E+00 |
| 7 | −4.6281796E−01 | 3.5508322E−02 | −3.3647678E−01 | 1.2257324E+00 | −3.6365113E+00 |
| 8 | −8.4341485E+00 | 7.3415086E−03 | 3.7680101E−01 | −4.6654617E+00 | −2.3746035E−01 |
| 9 | −1.6256410E+00 | −4.7644319E−02 | −4.8487770E−01 | 3.4671172E+00 | −8.3824518E+00 |
| 10 | −5.5136372E+01 | 4.9238773E−01 | −6.6140617E−01 | −1.6411327E−01 | 4.7803647E−01 |
| 11 | −2.9625497E+00 | 1.4259594E−01 | −1.0668629E+00 | 2.6844836E+00 | −4.9854525E+00 |

TABLE 16-continued

Example 8: Aspherical Surface Data

|   | A7 | A8 | A9 | A10 | A11 |
|---|---|---|---|---|---|
| 2 | −4.4826287E+00 | 3.4281338E+01 | −7.8101329E+01 | 9.4763477E+01 | −6.3627286E+01 |
| 3 | 3.1222671E+00 | −1.3053867E+00 | −1.1631202E+00 | −1.0924714E+00 | 4.1224242E+00 |
| 4 | −7.0275808E+01 | 1.2757532E+02 | −1.1387211E+02 | −1.1274716E+01 | 1.3910705E+02 |
| 5 | −3.0207449E+00 | 2.3584726E+01 | −5.4483343E+01 | 6.6381563E+01 | −3.9302633E+01 |
| 6 | −2.3279387E+00 | 1.7773919E−01 | 9.4571280E−01 | −1.6307446E+00 | 2.6678121E+00 |
| 7 | 7.1661703E+00 | −1.1065914E+01 | 1.5045860E+01 | −1.7826729E+01 | 1.6301287E+01 |
| 8 | 1.5195833E+00 | −2.1841227E+00 | 7.9917078E−01 | 6.8593292E−01 | 2.3998257E−02 |
| 9 | 1.1926224E+01 | −1.0710141E+01 | 4.5117166E+00 | 1.9448450E+00 | −3.9825997E+00 |
| 10 | 4.3454423E−02 | −3.0620757E−01 | 5.2548337E−02 | 5.4256116E−02 | 4.9484862E−02 |
| 11 | 6.9002443E+00 | −7.0324755E+00 | 5.2587523E+00 | −2.8688758E+00 | 1.1159241E+00 |

|   | A12 | A13 | A14 |
|---|---|---|---|
| 2 | 1.9508094E−01 | 4.4914856E−01 | −1.2698778E+00 |
| 3 | −2.4156747E+00 | −1.4703568E−01 | 3.2079196E−01 |
| 4 | −1.4455833E+02 | 6.6856237E+01 | −1.2210863E+01 |
| 5 | 6.3152204E−01 | 1.1935352E+01 | −4.4998823E+00 |
| 6 | −2.2692927E+00 | 6.8199734E−01 | 2.3461854E−02 |
| 7 | −1.0074428E+01 | 3.6468052E+00 | −5.7634496E−01 |
| 8 | −1.1349212E+00 | 8.2754496E−01 | −1.7840257E−01 |
| 9 | 2.4101676E+00 | −6.8993403E−01 | 7.8330736E−02 |
| 10 | −7.2060452E−02 | 2.6746281E−02 | −3.3042916E−03 |
| 11 | −2.9275921E−01 | 4.6119655E−02 | −3.2668966E−03 |

TABLE 17

Example 9
f = 4.39, Bf = 1.12

| Si | Ri | Di | Ndj | vdj |
|---|---|---|---|---|
| 1 (aperture stop) | ∞ | −0.17 | | |
| *2 | 1.4690 | 0.39 | 1.53391 | 55.89 |
| *3 | 10.4650 | 0.30 | | |
| *4 | −6.0035 | 0.35 | 1.63520 | 21.95 |
| *5 | −104.7830 | 0.27 | | |
| *6 | −9.8975 | 0.57 | 1.53391 | 55.89 |
| *7 | −12.5354 | 0.46 | | |
| *8 | −3.6728 | 0.38 | 1.63520 | 21.95 |
| *9 | −6.1174 | 0.10 | | |
| *10 | 1.9437 | 1.04 | 1.53391 | 55.89 |
| *11 | 1.5725 | 0.49 | | |
| 12 | ∞ | 0.14 | 1.51633 | 64.14 |
| 13 | ∞ | 0.54 | | |
| 14 (imaging plane) | ∞ | | | |

*aspherical surface

TABLE 18

Example 9: Aspherical Surface Data

| Surface Number | K | A3 | A4 | A5 | A6 |
|---|---|---|---|---|---|
| 2 | −2.3074051E+01 | −1.7267984E−02 | 1.3554484E+00 | −4.0743393E+00 | 1.7418071E+01 |
| 3 | −4.3361386E+01 | −5.5049453E−02 | 1.2350644E+00 | −1.2362109E+01 | 6.4029638E+01 |
| 4 | −4.1095297E+01 | 5.0129463E−03 | −3.4609187E−02 | 5.5041263E−02 | −2.5391080E−01 |
| 5 | −7.4422301E+01 | 4.9951600E−02 | −6.6836562E−01 | 4.9357265E+00 | −1.7674046E+01 |
| 6 | −1.7055356E+00 | −6.1046197E−02 | 1.9044223E−01 | −4.4349820E−01 | −3.9086412E+00 |
| 7 | −1.2275507E+01 | 2.3330056E−02 | −5.0662386E−01 | 2.7453463E+00 | −9.2365474E+00 |
| 8 | 7.1424622E−01 | 1.5579094E−01 | −1.5684699E−01 | 6.3718496E−01 | −5.6800513E−01 |
| 9 | −2.8179769E+00 | 1.2128847E−01 | 4.8219675E−02 | −5.2034869E−01 | 1.2671344E+00 |
| 10 | −8.5071436E+00 | 1.7460956E−01 | −9.2584787E−01 | 2.1822043E+00 | −4.0034188E+00 |
| 11 | −4.2278163E+00 | 1.2623616E−01 | −6.0334650E−01 | 1.0767890E+00 | −1.2545715E+00 |

|   | A7 | A8 | A9 | A10 | A11 |
|---|---|---|---|---|---|
| 2 | −7.6588985E+01 | 2.1700923E+02 | −3.5258181E+02 | 2.4347932E+02 | 1.6593195E+02 |
| 3 | −1.7562854E+02 | 1.6272177E+02 | 4.9668781E+02 | −2.0413014E+03 | 3.4495077E+03 |
| 4 | 5.1398004E−01 | 2.7066578E+00 | −1.0694091E+01 | 6.0999475E+00 | 2.8768544E+01 |
| 5 | 2.4012423E+01 | 4.0602672E+01 | −2.1213126E+02 | 3.3838443E+02 | −2.1431275E+02 |
| 6 | 1.9449963E+01 | −3.4578328E+01 | 9.7958592E+00 | 5.8822528E+01 | −9.6394520E+01 |
| 7 | 1.8048750E+01 | −2.1650148E+01 | 1.3764769E+01 | 9.9270297E−01 | −1.0050417E+01 |
| 8 | −1.0247570E+00 | 1.1650653E+00 | 1.1476590E+00 | −2.1244802E+00 | 4.5736917E−01 |
| 9 | −1.8717920E+00 | 1.4283804E+00 | −3.9135851E−01 | −1.4142568E−01 | 9.8200254E−02 |

TABLE 18-continued

Example 9: Aspherical Surface Data

| | | | | | |
|---|---|---|---|---|---|
| 10 | 4.6904458E+00 | −3.0882565E+00 | 7.2680923E−01 | 4.5719118E−01 | −4.4601697E−01 |
| 11 | 8.2996362E−01 | −8.5298450E−02 | −3.5837216E−01 | 3.3988486E−01 | −1.5724847E−01 |

| | A12 | A13 | A14 |
|---|---|---|---|
| 2 | −4.8069931E+02 | 3.7562728E+02 | −1.0704515E+02 |
| 3 | −3.2397971E+03 | 1.6555658E+03 | −3.6104608E+02 |
| 4 | −6.2705167E+01 | 5.1014342E+01 | −1.5470461E+01 |
| 5 | −3.7878214E+01 | 1.1937192E+02 | −4.4560784E+01 |
| 6 | 6.0384495E+01 | −1.2189966E+01 | −1.1627571E+00 |
| 7 | 8.4555548E+00 | −3.1457528E+00 | 4.4882390E−01 |
| 8 | 8.4698323E−01 | −6.0463749E−01 | 1.2289106E−01 |
| 9 | 8.2309365E−03 | −1.5553344E−02 | 2.7551817E−03 |
| 10 | 1.6252842E−01 | −2.8994980E−02 | 2.0957035E−03 |
| 11 | 4.1542970E−02 | −5.9900538E−03 | 3.6668454E−04 |

TABLE 19

Values Related to Conditional Formulae

| Formula | Conditional Expression | Example 1 | Example 2 | Example 3 | Example 4 | Example 5 | Example 6 | Example 7 | Example 8 | Example 9 |
|---|---|---|---|---|---|---|---|---|---|---|
| 1 | f/f1 | 1.29 | 1.42 | 1.22 | 1.18 | 1.21 | 1.22 | 1.34 | 1.33 | 1.39 |
| 2 | Nd2 | 1.63 | 1.63 | 1.63 | 1.63 | 1.63 | 1.63 | 1.63 | 1.63 | 1.64 |
| 3 | f/f2 | −0.18 | −0.36 | −0.01 | −0.06 | −0.03 | −0.01 | −0.18 | −0.53 | −0.44 |
| 4 | f234/f | −1.96 | −1.18 | −3.40 | −5.80 | −2.54 | −3.19 | −1.79 | −1.66 | −1.25 |
| 5 | ν d4 | 23.63 | 23.63 | 23.63 | 23.63 | 23.63 | 23.63 | 23.63 | 24.00 | 21.95 |

What is claimed is:

1. An imaging lens with a fixed focal length and consisting of five lenses, namely:
a first lens having a positive refractive power;
a second lens having a negative refractive power;
a third lens having a negative refractive power;
a fourth lens having a negative refractive power;
a fifth lens having a negative refractive power and an inflection point on the surface thereof toward the image side, provided in this order from the object side;
all of the first lens through the fifth lens being single lenses; and
the imaging lens satisfying the following conditional formulae:

$$1.5 < Nd2 < 1.8 \quad (2)$$

$$-10 < f234/f < -1.15 \quad (4)$$

$$\nu d4 < 35 \quad (5)$$

wherein Nd2 is the refractive index of the second lens with respect to the d line, f234 is the combined focal length of the second lens, the third lens, and the fourth lens, f is the fixed focal length of the entire system, and νd4 is the Abbe's number of the fourth lens with respect to the d line.

2. An imaging lens as defined in claim 1 that further satisfies the following conditional formula:

$$1 < f/f1 < 1.7 \quad (1)$$

wherein f is the focal length of the entire system, and f1 is the focal length of the first lens.

3. An imaging lens as defined in claim 1, wherein:
the fifth lens has a concave surface toward the image side.

4. An imaging lens as defined in claim 1 that further satisfies the following conditional formula:

$$-0.85 < f/f2 < 0 \quad (3)$$

wherein f2 is the focal length of the second lens.

5. An imaging lens as defined in claim 1, wherein:
an aperture stop is positioned at the object side of the surface of the second lens toward the object side.

6. An imaging lens as defined in claim 1, wherein:
the first lens is of a meniscus shape having a convex surface toward the object side.

7. An imaging lens as defined in claim 1, wherein:
the second lens has a concave surface toward the image side.

8. An imaging lens as defined in claim 1, wherein:
the second lens is of a meniscus shape.

9. An imaging lens as defined in claim 1, wherein:
the fourth lens has a concave surface toward the image side.

10. An imaging lens as defined in claim 9, wherein:
the fourth lens is of a meniscus shape.

11. An imaging lens as defined in claim 1, wherein:
the fifth lens is of a meniscus shape having a concave surface toward the image side.

12. An imaging lens as defined in claim 1, wherein:
the aperture stop is positioned at the object side of the surface of the first lens toward the object side.

13. An imaging lens as defined in claim 1 that further satisfies the following conditional formula:

$$-9 < f234/f < -1.15 \quad (4\text{-}1)$$

wherein f234 is the combined focal length of the second lens, the third lens, and the fourth lens.

14. An imaging apparatus equipped with an imaging lens with a fixed focal length and consisting of five lenses, namely:
a first lens having a positive refractive power;
a second lens having a negative refractive power;
a third lens having a negative refractive power;
a fourth lens having a negative refractive power;
a fifth lens having a negative refractive power and an inflection point on the surface thereof toward the image side, provided in this order from the object side;

all of the first lens through the fifth lens being single lenses the imaging apparatus equipped to provide electronic imaging; and the imaging lens satisfying the following conditional formulae:

$$1.5 < Nd2 < 1.8 \quad (2)$$

$$-10 < f234/f < -1.15 \quad (4)$$

$$vd4 < 35 \quad (5)$$

wherein Nd2 is the refractive index of the second lens with respect to the d line, f234 is the combined focal length of the second lens, the third lens, and the fourth lens, f is the fixed focal length of the entire system, and vd4 is the Abbe's number of the fourth lens with respect to the d line.

15. An imaging lens with a fixed focal length and consisting of five lenses, namely:
    a first lens having a positive refractive power;
    a second lens having a negative refractive power;
    a third lens having a negative refractive power;
    a fourth lens having a negative refractive power;
    a fifth lens having a negative refractive power and an inflection point on the surface thereof toward the image side, provided in this order from the object side;
    all of the first lens through the fifth lens being single lenses; and
    the imaging lens satisfying the following conditional formulae:

$$1.10 < f/f1 < 1.40 \quad (1\text{-}2)$$

$$1.5 < Nd2 < 1.8 \quad (2)$$

$$-10 < f234/f < -1.15 \quad (4)$$

wherein Nd2 is the refractive index of the second lens with respect to the d line, f234 is the combined focal length of the second lens, the third lens, and the fourth lens, f is the fixed focal length of the entire system, and f1 is the focal length of the first lens.

16. An imaging lens as defined in claim 15, wherein:
    the fifth lens has a concave surface toward the image side.

17. An imaging lens as defined in claim 15 that further satisfies the following conditional formula:

$$-0.85 < f/f2 < 0 \quad (3)$$

wherein f2 is the focal length of the second lens.

18. An imaging lens as defined in claim 15, wherein:
    an aperture stop is positioned at the object side of the surface of the second lens toward the object side.

19. An imaging lens as defined in claim 15, wherein:
    the first lens is of a meniscus shape having a convex surface toward the object side.

20. An imaging apparatus equipped with an imaging lens with a fixed focal length and consisting of five lenses, namely:
    a first lens having a positive refractive power;
    a second lens having a negative refractive power;
    a third lens having a negative refractive power;
    a fourth lens having a negative refractive power;
    a fifth lens having a negative refractive power and an inflection point on the surface thereof toward the image side, provided in this order from the object side;
    all of the first lens through the fifth lens being single lenses the imaging apparatus equipped to provide electronic imaging; and
    the imaging lens satisfying the following conditional formulae:

$$1.10 < f/f1 < 1.40 \quad (1\text{-}2)$$

$$1.5 < Nd2 < 1.8 \quad (2)$$

$$-10 < f234/f < -1.15 \quad (4)$$

wherein Nd2 is the refractive index of the second lens with respect to the d line, f234 is the combined focal length of the second lens, the third lens, and the fourth lens, f is the fixed focal length of the entire system, and f1 is the focal length of the first lens.

* * * * *